(12) United States Patent
Khoshnevisan et al.

(10) Patent No.: US 12,484,058 B2
(45) Date of Patent: Nov. 25, 2025

(54) SIGNALING FRAMEWORK FOR RATE SPLITTING

(71) Applicant: QUALCOMM Incorporated, San Diego, CA (US)

(72) Inventors: Mostafa Khoshnevisan, San Diego, CA (US); Jing Sun, San Diego, CA (US); Rajat Prakash, San Diego, CA (US); Xiaoxia Zhang, San Diego, CA (US); Ahmed Abdelaziz Ibrahim Abdelaziz Zewail, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 670 days.

(21) Appl. No.: 17/833,264

(22) Filed: Jun. 6, 2022

(65) Prior Publication Data

US 2023/0397208 A1    Dec. 7, 2023

(51) Int. Cl.
*H04W 72/20*     (2023.01)
*H04L 1/00*      (2006.01)

(52) U.S. Cl.
CPC .......... *H04W 72/20* (2023.01); *H04L 1/0003* (2013.01); *H04L 1/0027* (2013.01)

(58) Field of Classification Search
CPC .... H04W 72/20; H04L 1/0003; H04L 1/0027; H04L 1/0075; H04L 1/06; H04L 1/0048
See application file for complete search history.

(56) References Cited

U.S. PATENT DOCUMENTS

| | | | |
|---|---|---|---|
| 2011/0299484 A1* | 12/2011 | Nam | H04L 1/0025 370/329 |
| 2013/0170469 A1* | 7/2013 | Yu | H04L 5/0046 370/330 |

(Continued)

FOREIGN PATENT DOCUMENTS

| | | | | |
|---|---|---|---|---|
| EP | 2369757 A2 | 9/2011 | | |
| WO | WO-2010051519 A2 * | 5/2010 | ............ | H04B 17/24 |
| WO | WO-2012064998 A2 * | 5/2012 | ............ | H04L 1/0025 |

OTHER PUBLICATIONS

Fu H., et al., "Robust Secure Beamforming Design for Two-User Downlink MISO Rate-Splitting Systems", IEEE Transactions on Wireless Communications, IEEE Service Center, Piscataway, NJ, US, vol. 19, No. 12, Sep. 14, 2020, pp. 8351-8365, XP011823933, Sections I, II.

(Continued)

*Primary Examiner* — Charles C Jiang
*Assistant Examiner* — Rachel Elizabeth Marks
(74) *Attorney, Agent, or Firm* — Holland & Hart LLP

(57) ABSTRACT

Methods, systems, and devices for wireless communications at a first user equipment (UE) are described. A first UE may receive one or more control signaling messages including first scheduling parameters for a common codeword associated with downlink data for the first UE and with downlink data for a second UE and one or more second scheduling parameters for a private codeword associated with additional downlink data for the first UE. The first UE may receive a physical downlink shared channel message including the (Continued)

common codeword mapped to one or more first layers of the physical downlink shared channel message and the private codeword mapped to one or more second layers of the physical downlink shared channel message. Additionally or alternatively, the first UE may receive a first physical downlink shared channel message including the common codeword and a second physical downlink shared channel message including the private codeword.

30 Claims, 12 Drawing Sheets

(56) References Cited

U.S. PATENT DOCUMENTS

| | | | | |
|---|---|---|---|---|
| 2022/0224471 A1* | 7/2022 | Kim | ................... | H04W 72/23 |
| 2022/0312334 A1* | 9/2022 | Gao | ................... | H04L 1/0003 |
| 2023/0224108 A1* | 7/2023 | Yuan | ................... | H04L 5/0035 |
| | | | | 370/330 |
| 2023/0388045 A1* | 11/2023 | Khoshnevisan | ...... | H04L 1/0009 |

OTHER PUBLICATIONS

International Search Report and Written Opinion—PCT/US2023/066600—ISA/EPO—Aug. 24, 2023.

Li D., et al., "Precoding Optimization Assisted Secure Transmission for Rate-Splitting Multiple Access", ICC 2022—IEEE International Conference on Communications, IEEE, May 16, 2022, pp. 673-678, XP034168591, Sections I, II.

* cited by examiner

SIGNALING FRAMEWORK FOR RATE SPLITTING

TECHNICAL FIELD

The following relates to wireless communication, and specifically, a signaling framework that supports rate splitting for a user equipment (UE).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

During wireless communications, rate-splitting techniques may be used in which a message to be transmitted to a UE may be divided into at least a private portion and a common portion. The common portion may be combined with other such common portions of other messages to be transmitted to other UEs, and the combined common portions may be transmitted in a common codeword to a group of UEs that includes the UE. The private portion may be transmitted in a private codeword to the UE. However, some control signaling frameworks may not accommodate such communication schemes, or these communication schemes may be less effective.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may include receiving one or more control signaling messages including: one or more first scheduling parameters for a common codeword associated with downlink data for the first UE and with downlink data for a second UE and one or more second scheduling parameters for a private codeword associated with additional downlink data for the first UE and receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

One innovative aspect of the subject matter described in this disclosure can be implemented in an apparatus for wireless communication. The apparatus for wireless communication at a first UE is described. The apparatus may include a processor, memory coupled with the processor, and instructions stored in the memory. The instructions may be executable by the processor to cause the apparatus to receive one or more control signaling messages including: one or more first scheduling parameters for a common codeword associate with downlink data for the first UE and with downlink data for a second UE and one or more second scheduling parameters for a private codeword associate with additional downlink data for the first UE and receive, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

Another innovative aspect of the subject matter described in this disclosure can be implemented in an apparatus for wireless communication at a first UE. The apparatus may include means for receiving one or more control signaling messages including: means for one or more first scheduling parameters for a common codeword associated with downlink data for the first UE and with downlink data for a second UE and means for one or more second scheduling parameters for a private codeword associated with additional downlink data for the first UE and means for receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

Another innovative aspect of the subject matter described in this disclosure can be implemented in a non-transitory computer-readable medium storing code for wireless communication at a first UE. The code may include instructions executable by a processor to receive one or more control signaling messages including: one or more first scheduling parameters for a common codeword associate with downlink data for the first UE and with downlink data for a second UE and one or more second scheduling parameters for a private codeword associate with additional downlink data for the first UE and receive, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

In some examples of the method, apparatuses, and non-transitory computer-readable medium described herein, the one or more first scheduling parameters include a first modulation and coding scheme associated with the common codeword, the one or more second scheduling parameters include a second modulation and coding scheme associated with the private codeword, and a first modulation and coding scheme index value associated with the first modulation and coding scheme may be less than a second modulation and coding scheme index value associated with the second modulation and coding scheme.

In some examples of the method, apparatuses, and non-transitory computer-readable medium described herein, a quantity of the one or more first layers of the physical downlink shared channel message may be less than a quantity of the one or more second layers of the physical downlink shared channel message.

In some examples of the method, apparatuses, and non-transitory computer-readable medium described herein, a first control signaling message of the one or more control signaling messages includes one or more fields having one or more values that indicate the common codeword may be mapped to the one or more first layers of the physical downlink shared channel message, the private codeword may be mapped to the one or more second layers of the physical downlink shared channel message, or both.

In some examples of the method, apparatuses, and non-transitory computer-readable medium described herein, the one or more fields include a second value that indicates that the common codeword and the private codeword may be to be received in the physical downlink shared channel message.

In some examples of the method, apparatuses, and non-transitory computer-readable medium described herein, the one or more control signaling messages include a first control signaling message that schedules transmission of the common codeword and a second control signaling message that schedules transmission of the private codeword and the first control signaling message may be a group common control signaling message for a set of multiple UEs, including the UE, and the second control signaling message may be for the first UE.

In some examples of the method, apparatuses, and non-transitory computer-readable medium described herein, the first control signaling message includes common parameters for the first UE and the second UE, common parameters for the common codeword and the private codeword, or both.

In some examples of the method, apparatuses, and non-transitory computer-readable medium described herein, the second control signaling message includes one or more parameters that may be associated with the private codeword and specific to the first UE.

In some examples of the method, apparatuses, and non-transitory computer-readable medium described herein, the second control signaling message omits one or more parameters, included in the first control signaling message, that may be associated with both the common codeword and the private codeword.

In some examples of the method, apparatuses, and non-transitory computer-readable medium described herein, the one or more first scheduling parameters, the one or more second scheduling parameters, or both, include a modulation and coding scheme, a new data indicator, a redundancy version, one or more demodulation signal reference ports, a frequency domain resource allocation, a time domain resource allocation, a hybrid automatic repeat request identifier, or any combination thereof.

In some examples of the method, apparatuses, and non-transitory computer-readable medium described herein, the downlink data for the first UE includes a first portion of one or more downlink messages for the first UE and the additional downlink data for the first UE includes a second portion of the one or more downlink messages for the first UE and an allocation of bits between the first portion and the second portion may be based on a first channel quality associated with the common codeword and a second channel quality associated with the private codeword.

Another innovative aspect of the subject matter described in this disclosure can be implemented in a method for wireless communication at a first UE. The method may include receiving one or more control signaling messages including one or more first scheduling parameters for a common codeword associated with downlink data for the first UE and downlink data for a second UE, and one or more second scheduling parameters for a private codeword associated with additional downlink data for the first UE, receiving, in a first set of time and frequency resources and based on the one or more first scheduling parameters, a first physical downlink shared channel message including the common codeword, and receiving, in a second set of time and frequency resources that at least partially overlaps with the first set of time and frequency resources and based on the one or more second scheduling parameters, a second physical downlink shared channel message including the private codeword.

Another innovative aspect of the subject matter described in this disclosure can be implemented in an apparatus for wireless communication at a first UE. The apparatus may include a processor, memory coupled with the processor, and instructions stored in the memory. The instructions may be executable by the processor to cause the apparatus to receive one or more control signaling messages including one or more first scheduling parameters for a common codeword associated with downlink data for the first UE and downlink data for a second UE, and one or more second scheduling parameters for a private codeword associated with additional downlink data for the first UE, receive, in a first set of time and frequency resources and based on the one or more first scheduling parameters, a first physical downlink shared channel message including the common codeword, and receive, in a second set of time and frequency resources that at least partially overlaps with the first set of time and frequency resources and based on the one or more second scheduling parameters, a second physical downlink shared channel message including the private codeword.

Another innovative aspect of the subject matter described in this disclosure can be implemented in an apparatus for wireless communication at a first UE. The apparatus may include means for receiving one or more control signaling messages including one or more first scheduling parameters for a common codeword associated with downlink data for the first UE and downlink data for a second UE, and one or more second scheduling parameters for a private codeword associated with additional downlink data for the first UE, means for receiving, in a first set of time and frequency resources and based on the one or more first scheduling parameters, a first physical downlink shared channel message including the common codeword, and means for receiving, in a second set of time and frequency resources that at least partially overlaps with the first set of time and frequency resources and based on the one or more second scheduling parameters, a second physical downlink shared channel message including the private codeword.

Another innovative aspect of the subject matter described in this disclosure can be implemented in a non-transitory computer-readable medium storing code for wireless communication at a first UE. The code may include instructions executable by a processor to receive one or more control signaling messages including one or more first scheduling parameters for a common codeword associated with downlink data for the first UE and downlink data for a second UE, and one or more second scheduling parameters for a private codeword associated with additional downlink data for the first UE, receive, in a first set of time and frequency resources and based on the one or more first scheduling parameters, a first physical downlink shared channel message including the common codeword, and receive, in a second set of time and frequency resources that at least partially overlaps with the first set of time and frequency resources and based on the one or more second scheduling parameters, a second physical downlink shared channel message including the private codeword.

In some examples of the method, apparatuses, and non-transitory computer-readable medium described herein, the one or more control signaling messages include a first control signaling message scheduling transmission of the common codeword and a second control signaling message scheduling transmission of the private codeword.

In some examples of the method, apparatuses, and non-transitory computer-readable medium described herein, the first control signaling message may be in a first control resource set associated with a first control resource set pool index value and the second control signaling message may be in a second control resource set associated with a second control resource set pool index value.

Some examples of the method, apparatuses, and non-transitory computer-readable medium described herein may further include operations, features, means, or instructions for performing an interference cancelation procedure including: decoding the common codeword, subtracting, from a combined signal including the common codeword and the private codeword, a portion of the combined signal corresponding to the common codeword, and decoding the private codeword based on a remaining portion of the combined signal that corresponds to the private codeword and where receiving the first physical downlink shared channel message, the second physical downlink shared channel message, or both, may be based on the interference cancelation procedure.

In some examples of the method, apparatuses, and non-transitory computer-readable medium described herein, the second control signaling message includes a field having a first value that indicates that the common codeword may be to be received by the first UE over the first set of time and frequency resources.

In some examples of the method, apparatuses, and non-transitory computer-readable medium described herein, the first control signaling message includes a field having a first value that indicates that the private codeword may be to be received by the first UE over the second set of time and frequency resources.

In some examples of the method, apparatuses, and non-transitory computer-readable medium described herein, the first control signaling message schedules transmission of the first physical downlink shared channel message and the second control signaling message schedules transmission of the second physical downlink shared channel message and the method, apparatuses, and non-transitory computer-readable medium may include further operations, features, means, or instructions for jointly processing the first physical downlink shared channel message and the second physical downlink shared channel message based on one or more scheduling parameters of the one or more first scheduling parameters and the one or more second scheduling parameters being common.

In some examples of the method, apparatuses, and non-transitory computer-readable medium described herein, the first set of time and frequency resources and the second set of time and frequency resources completely overlap.

In some examples of the method, apparatuses, and non-transitory computer-readable medium described herein, the first control signaling message may be a group common control signaling message and the second control signaling message may be for the first UE.

In some examples of the method, apparatuses, and non-transitory computer-readable medium described herein, the downlink data for the UE includes a first portion of one or more downlink messages for the UE and the additional downlink data for the UE includes a second portion of the one or more downlink messages for the UE and an allocation of bits between the first portion and the second portion may be based on a first channel quality associated with the common codeword and a second channel quality associated with the private codeword.

DETAILED DESCRIPTION

Figure 1:
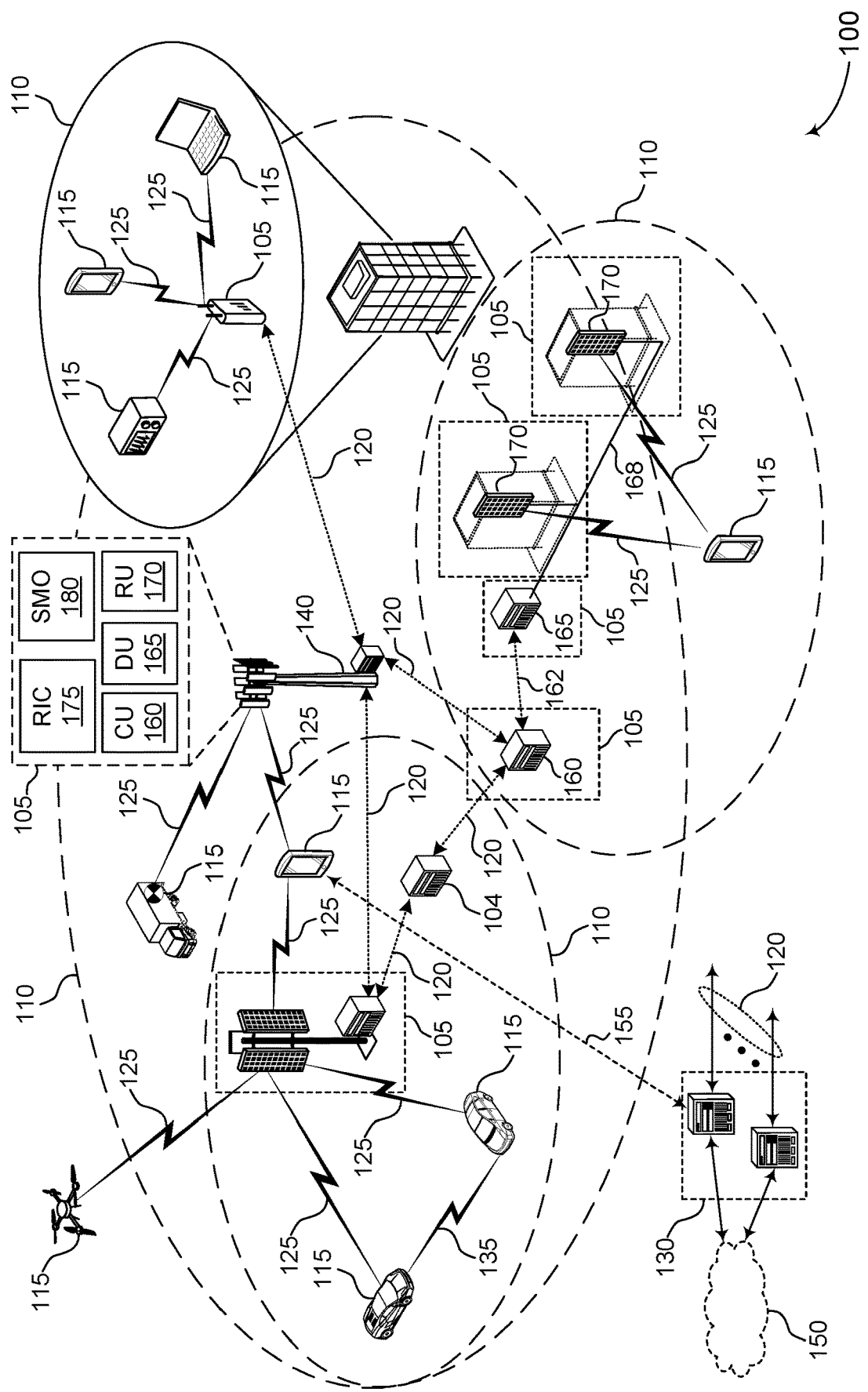
FIG. 1 illustrates an example of a wireless communications system that supports a signaling framework for rate splitting in accordance with one or more aspects of the present disclosure.

In wireless communications, rate-splitting techniques may be used to improve characteristics of channels, such as broadcast channels, including increasing the number of degrees of freedom and capacity of wireless channels for communications, among other aspects. In such approaches, messages destined for various user equipments (UEs) may be split into "common" parts and "private" parts (for example, common codewords (CWs) and private CWs). The common parts of messages destined for the various UEs may be combined in a single common codeword, and each of the private parts may be maintained separate from each other in respective private CWs (for example, on a per-UE basis). The common CW may be transmitted to multiple UEs and each private CW may be respectively transmitted to an associated UE of the multiple UEs so that each UE may receive an entire respective message (including at least the common CW and the respective private CW). However, some control signaling frameworks may not accommodate such communication schemes, and those that do need improvement.

Various aspects generally relate to rate-splitting techniques, and more specifically, to control signaling frameworks for rate-splitting. To support rate-splitting, a network may transmit one or more downlink messages (for example, physical downlink shared channel (PDSCH) messages) that include a private CW and a common CW, that respectively carry different portions of a message destined for the UE. In some examples, a network entity may allocate information of the message between the private CW and the common CW based on channel conditions over which the private CW and the common CW are to be transmitted. For example, different downlink messages or different spatial layers of a same downlink message may be subject to different conditions, and it may be advantageous to allocate more or less information to the private CW or the common CW. In some examples, a single downlink message may carry both the private CW and the common CW. In some such examples, the private CW may be mapped to one or more first layers of a downlink message and the common CW may be mapped to one or more second layers of the same downlink message. In other examples, each of the private CW and the common CW may be carried by a separate respective downlink message (for example, a respective PDSCH). In either case, the network entity may transmit one or more control signaling messages (for example, downlink control information (DCI) messages) that indicate scheduling parameters for the private CW and the common CW. In some examples, a network entity may transmit a single control signaling message that may schedule or indicate both the private CW and the common CW. In approaches utilizing multiple control signaling messages, different control signaling messages may schedule or indicate the private CW and the common CW separately. A control signaling message scheduling or indicating the common CW may be transmitted to multiple UEs (for example, UEs to which data in the common CW is to be transmitted), and a control signaling message scheduling or indicating the private CW may be transmitted to the UE. In some examples, a control signaling message may indicate the presence of another CW that is to be transmitted (for example, control signaling carrying a private CW may indicate that a corresponding common CW is also transmitted or will be transmitted, or vice-versa) so that a UE may properly decode the CWs and receive data. Further, the various control signaling approaches described herein may use new or modified control signaling formats (for example, DCI formats) that may be tailored for use in rate-splitting scenarios. For example, some control signaling formats described herein may include a reduced or modified quantity of parameters or may include one or more new fields to be included in the control signaling. Finally, enabling the use of rate splitting may allow the UE to perform successive interference cancelation using the private CW and the common CW.

Particular aspects of the subject matter described in this disclosure may be implemented to realize one or more of the following potential advantages. The techniques employed by the described communication devices may provide benefits and enhancements, including a coordination of rate-splitting techniques that result in increased degrees of freedom and increased capacity for wireless communication networks due to the dynamic allocation of message information between the common CW and the private CW that takes advantage of differing channel conditions. For example, by providing control signaling that enables the use of rate splitting, a wireless communications system may allocate more information to the private CW or the common CW to take advantage of better channel conditions of one CW versus the other, thereby increasing degrees of freedom and capacity available to the wireless communications system. Additional benefits or enhancements may include reduced control signaling overhead and increased control signaling capability. For example, by using the modified or reduced control signaling formats, control signaling overhead may be reduced as less control signaling information may be transmitted in one or more control signaling messages. Additionally or alternatively, control signaling formats may include one or more new fields that may indicate the presence or identification of the private CW, the common CW, or both. Such functionality is not available in some current wireless communications systems. Finally, such approaches for the control signaling framework for rate-splitting further provide an improved quality of transmissions because a receiving UE may perform successive interference cancelation procedures on received CWs, among other benefits.

Aspects of the disclosure are initially described in the context of wireless communications systems. Aspects of the disclosure are then described with relation to a rate-splitting scheme, wireless communications systems, and process flows. Aspects of the disclosure are further illustrated by and described with reference to apparatus diagrams, system diagrams, and flowcharts that relate to a signaling framework for rate splitting.

FIG. 1 illustrates an example of a wireless communications system 100 that supports a signaling framework for rate splitting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending upon which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

For instance, an access network (AN) or RAN may include communications between access nodes (for example, an IAB donor), IAB nodes 104, and one or more UEs 115. The IAB donor may facilitate connection between the core network 130 and the AN (for example, via a wired or wireless connection to the core network 130). That is, an IAB donor may refer to a RAN node with a wired or wireless connection to core network 130. The IAB donor may include a CU 160 and at least one DU 165 (for example, and RU 170), in which case the CU 160 may communicate with the core network 130 via an interface (for example, a backhaul link). IAB donor and IAB nodes 104 may communicate via an F1 interface according to a protocol that defines signaling messages (for example, an F1 AP protocol). Additionally, or alternatively, the CU 160 may communicate with the core network via an interface, which may be an example of a portion of backhaul link, and may communicate with other CUs 160 (for example, a CU 160 associated with an alternative IAB donor) via an Xn-C interface, which may be an example of a portion of a backhaul link.

An IAB node 104 may refer to a RAN node that provides IAB functionality (for example, access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (for example, an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (for example, DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (for example, a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (for example, transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support a signaling framework for rate splitting as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communications system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communications (for example, in an FDD mode) or may be configured to carry downlink and uplink communications (for example, in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communications system 100 (for example, the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate using the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (for example, from 30 GHz to 300 GHz), also known as the millimeter band. In some examples, the wireless communications system 100 may support millimeter wave (mmW) communications between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communications with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a network entity 105 may transmit control signaling to the UE 115 that may scheduling transmission of a private CW (p-CW) and a common CW (c-CW). In some examples, the p-CW and the c-CW may be scheduled to be transmitted on different spatial layers of a PDSCH transmission, and the scheduling may be done with a single control signaling message or with multiple control signaling messages (for example, one control signaling message for the p-CW and another for the c-CW). In other examples, the p-CW and the c-CW may be scheduled to be transmitted on separate PDSCH transmissions which may at least partially overlap in time, in frequency, or both. In some examples, a control signaling messages may include a field to indicate the presence of the p-CW, c-CW, or both.

Figure 2A:
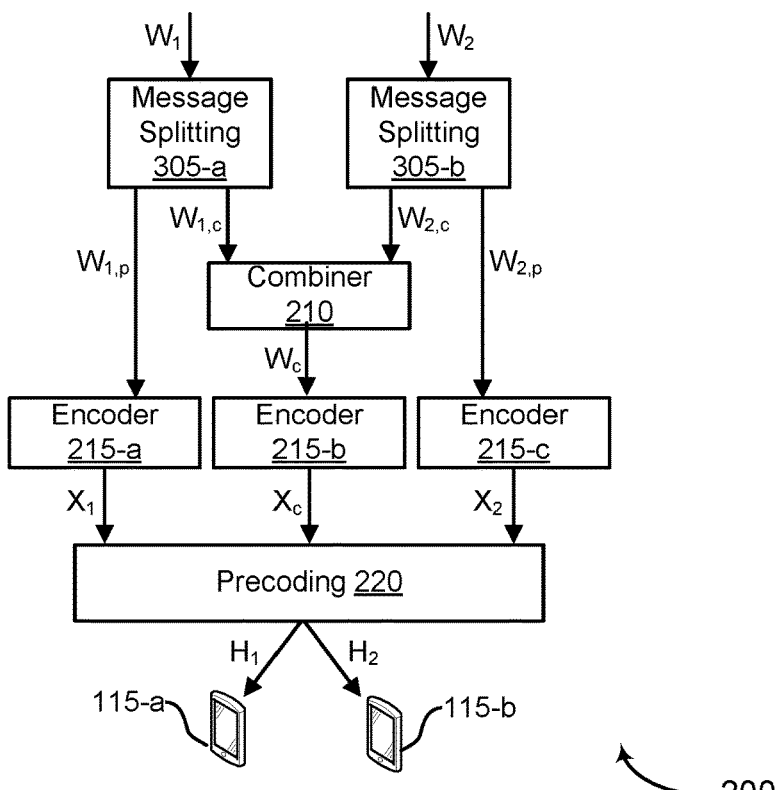
FIGS. 2A and 2B illustrate examples of a rate-splitting transmission scheme and a rate-splitting reception scheme that support a signaling framework for rate splitting in accordance with one or more aspects of the present disclosure.
Figure 2B:
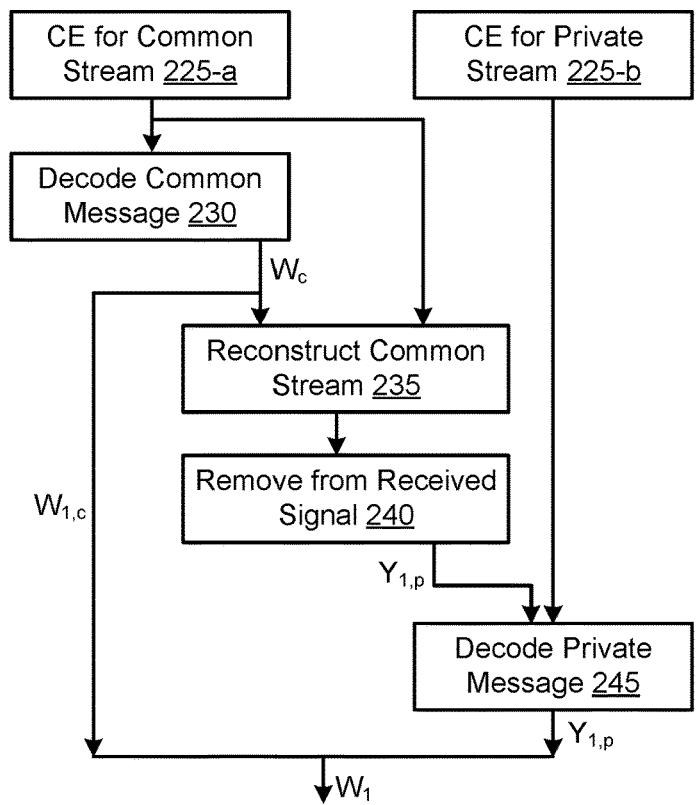

FIGS. 2A and 2B illustrate an example of a rate-splitting transmission scheme 200 and a rate-splitting reception scheme 201 that support a signaling framework for rate splitting in accordance with one or more aspects of the present disclosure. In wireless communications, rate-splitting techniques may be used to improve characteristics of communication channels, including degrees of freedom and capacity of wireless channels. In such approaches, messages destined for various UEs may be split into "common" parts and "private" parts. The common parts of messages for the various UEs may be combined in a single common codeword (CW), and each of the private parts may be maintained separate in respective private CWs (for example, on a per-UE basis). The common CW may be transmitted to multiple UEs and each private CW may each respectively be transmitted to each of the multiple UEs, so that each UE may receive their entire respective messages.

For example, as depicted in FIG. 2A, UE 115-$a$ and UE 115-$b$ may each have a message that they are to receive, depicted as $W_1$ and $W_2$. Each of the messages $W_1$ and $W_2$ may be split via message splitting 205-$a$ and message splitting 205-$b$, respectively, resulting in $W_{1,p}$, representing a portion of the message corresponding to a p-CW for UE 115-$a$, and $W_{1,c}$, representing a portion of the message corresponding to c-CW. Similar splitting for $W_2$ results in $W_{2,p}$, representing a portion of the message corresponding to a p-CW for UE 115-$b$, and $W_{2,c}$, representing a portion of the message corresponding to the common codeword. The splitting between the private and common messages or codewords may be determined or selected based on one or more characteristics of a channel, one or more wireless devices, or any combination thereof. The combiner 210 may combine $W_{1,c}$ and $W_{2,c}$, resulting in $W_c$, which may have one or more layers. Each of $W_{1,p}$, $W_c$, and $W_{2,p}$ may be encoded by encoder 215-$a$, encoder 215-$b$, and encoder 215-$c$, respectively, resulting in separate CWs $X_1$, $X_c$, and $X_2$. In some examples, the encoders 215 may include one or more additional operations, including modulation, layer mapping, other operations, or any combination thereof. CWs $X_1$, $X_c$, and $X_2$ may be processed through precoding 220, resulting in $H_1$ destined for UE 115-$a$ and $H_2$ destined for UE 115-$b$. In this way, each UE receives the private portion of its message that is only transmitted to that UE, while also receiving the common portion of the message that is transmitted to both UE 115-$a$ and UE 115-$b$.

In FIG. 2B, an example reception scheme for rate splitting is depicted. The UE may receive the transmission (for example, $H_1$ or $H_2$) destined for the UE, and the UE may then first decode the common message. Decoding the common message may be done for multiple purposes. First, some part of the individual message for each UE ($W_{1,c}$ and $W_{2,c}$) may be embedded in the common message $W_c$, which is the data intended for that UE. Second, successive interference cancelation or joint demodulation/decoding may be used to decode the private message.

For example, the UE may estimate the effective channel (for example, at CE for Common Stream 225-$a$) corresponding to common stream (for example, $H_1P_c$), decodes the common message $W_c$ (for example, at Decode Common Message 230), re-encodes to common stream $X_c$ (for example, at Reconstruct Common Stream 235), multiplies by the estimated effective channel and subtracts from the received signal (for example, at Remove from Received Signal 240), resulting in $Y_{1,p}$. Then, the UE may decode the private message using $Y_{1,p}$ (for example, at Decode Private Message 245), which may also incorporate or utilize a result of the CE for Private Stream 225-$b$. Optionally, the decoding may also include demodulation, demapping (for example, from one or more layers), other processing, or any combination thereof. Then, the UE may combine a portion of the common message $W_{1,c}$ and the private message $Y_{1,p}$ to recover the full message destined for the UE ($W_1$). While the focus of FIG. 2B is on SIC decoding, in another example, the UE may jointly demodulate or decode the common stream and the private stream. In this way, the wireless communications system may utilize rate splitting to improve characteristics of communication channels, including degrees of freedom and capacity of wireless channels.

Figure 3:
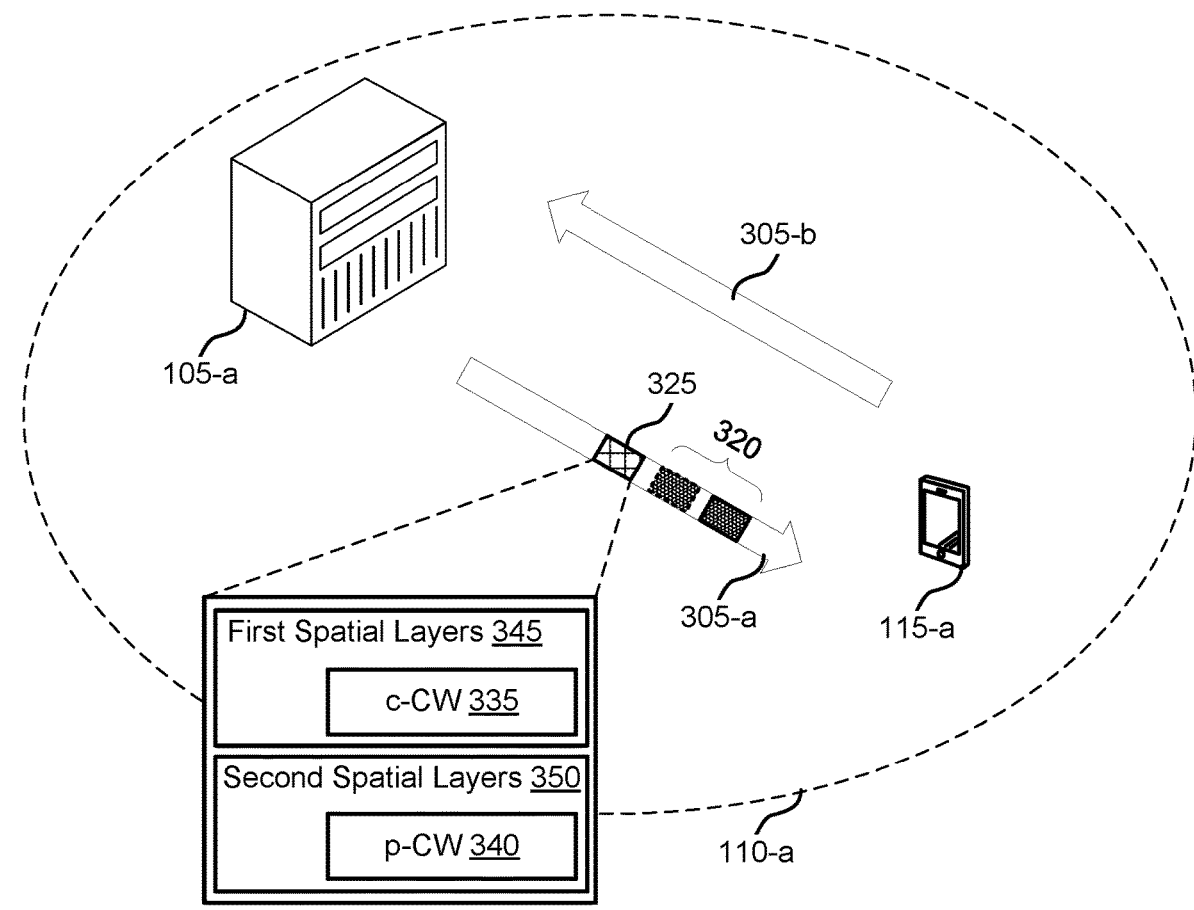
FIG. 3 illustrates an example of a wireless communications system that supports a signaling framework for rate splitting in accordance with one or more aspects of the present disclosure.

FIG. 3 illustrates an example of a wireless communications system 300 that supports a signaling framework for rate splitting in accordance with one or more aspects of the present disclosure. The wireless communications system 300 may include network entity 105-*a* and UE 115-*a* which may communicate within a geographic coverage area 110-*a* that may be associated with the network entity 105-*a*. The network entity 105-*a* and UE 115-*a* may communicate via one or more downlink communication links 305-*a* and one or more uplink communication links 305-*b*.

In wireless communications (for example, NR communications), multiple layers may be used for transmission of multiple CWs, and the multiple CWs may be mapped to different layers of a single PDSCH transmission. For example, given 5 layers, a first CW may be mapped to the first 2 layers and a second CW may be mapped to the remaining 3 layers (for example, in a 2+3 division or scheme). For example, in examples in which a parameter designating a quantity (for example, a maximum quantity) of CWs that are to be scheduled (for example, maxNrofCodeWordsScheduledByDCI) equals or has a value of 2, control signaling (for example, DCI) that schedules a PDSCH transmission (for example, of a DCI format, such as 1_1) may include separate fields for one or more fields for a modulation and coding scheme (MCS), new data indicator (NDI), redundancy version (RV), or any combination thereof, for multiple CWs. In some examples, one or more other scheduling parameters such as HARQ ID, FDRA, TDRA, PRG size, other parameters, or any combination thereof, may be the same for the two scheduled CWs. In some examples, DCI may dynamically disable one or more of the CWs (for example, in examples in which a quantity of layers is 4 or smaller in a scheduling instance) based on one or more of an MCS value or an RV value for the corresponding CW being set to a reserved value.

In some examples, multiple TRPs may be used for communication with UEs. For example, a UE may be scheduled with two PDSCH messages that may be non-overlapping in time, in frequency, or both. Additionally or alternatively, the two PDSCH message may be at least partially overlapping in time, frequency, or both. The two PDSCH messages may be scheduled via corresponding control signaling messages (for example, DCIs) that may be transmitted from different TRPs. Such operations in the case of PDSCH overlap (for example partial or full overlap in at least the time domain) may be allowed in examples in which the two PDSCH transmissions are associated with different resource set values (for example, CORESET values or CORESSET-PoolIndex values that may also be TRP identifiers). For example, in a scenario with two PDSCH transmissions and two CORESETs, each CORESET may be configured with a corresponding value of CORESETPoolIndex (for example, 0 and 1, grouping the CORESETs into two groups).

In some examples, a wireless communications network may employ multicast group scheduling (for example for RRC_CONNECTED UEs). In such a scenario, a common frequency resource (CFR) for a group-common PDCCH/PDSCH transmission may be confined within a frequency resource of a dedicated unicast BWP. In some examples, a group common PDCCH (GC-PDCCH) may bear a CRC that may be scrambled by a common radio network temporary identifier (RNTI) may be used to schedule a GC-PDSCH that may be scrambled by the same RNTI. In some examples, CFR may be defined as a multicast and broadcast services "(MBS) frequency region."

A CFR may include various configuration items or parameters, including: a starting PRB; a quantity of PRBs (for example, similar to a locationAndBandwidth parameter associated with a BWP); a PDSCH-config-Multicast parameter that may be separate from that of the dedicated unicast BWP; a PDCCH-config-Multicast parameter that may be separate from that of the dedicated unicast BWP; and a CORESET for GC-PDCCH that may be configured within a CFR. In some examples, two DCI formats may be used for multicast GC-PDCCH to schedule GC-PDSCH. A first format may be DCI format 4_1 that may have fields that are similar to existing fields in DCI format 1_0 (a fallback DCI) with CRC scrambled with G-RNTI. In some examples, the size of such a DCI format 4_1 may be aligned with DCI format 1_0 with CRC scrambled by C-RNTI monitored in CSS. A second format may be DCI format 4_2 that may be similar to existing fields in DCI format 1_1 with CRC scrambled with G-RNTI. In some examples, the size of DCI format 4_2 may be configured for each CFR for all G-RNTIs by unicast RRC signaling.

To provide control signaling frameworks for use in connection with rate-splitting approaches, the network entity 105-*a* may transmit scheduling parameters associated with the c-CW and the p-CW to the UE 115-*a*. The scheduling parameters may include one or more of MCS parameters, NDI parameters, RV parameters, or other parameters. Depending on the particular framework employed to transmit these scheduling parameters, the network entity 105-*a* may either utilize a single control signaling message or multiple control signaling messages. In examples in which the network entity 105-*a* transmits multiple control signaling messages, the first control signaling message may include parameters for the c-CW, which may be the same across multiple co-scheduled UEs. In some examples, the first control signaling message may be a group-common (GC) control signaling message and the CRC of the first control signaling message may be scrambled with a group RNTI (G-RNTI). The same G-RNTI may be configured for all co-scheduled UEs. For example, MBS control signaling message formats (for example, formats 4_0, 4_1, or 4_2) may be used. In examples in which the network entity 105-*a* transmits multiple control signaling messages, the multiple control signaling messages may be self-contained or may not be self-contained.

In some examples, the network entity 105-*a* may transmit a PDSCH message 325 to the UE 115-*a*. The PDSCH message 325 may contain both the c-CW 335 and the p-CW 340. The c-CW 335 may be mapped to one or more first spatial layers 345 and the p-CW 340 may be mapped to one or more second spatial layers 350. In some examples, the network entity 105-*a* may transmit the control signaling 320 that may schedule both the c-CW 335 and the p-CW 340 for transmission in the PDSCH message 325. In some examples, the PDSCH message 325 may be UE-specific as the p-CW 340 may be different than a p-CW for another UE. For example, the p-CW 340 may be scrambled with a C-RNTI.

In some examples, the control signaling 320 may be a DCI and may be of a DCI format 1_1 with multiple CWs, such as the c-CW 335 and the p-CW 340. However, it may not be clear which CW listed or indicated in the DCI is the p-CW 340 and which is the c-CW 335. In some examples, the c-CW may be mapped to the first scheduled CW and p-CW is mapped to the second scheduled CW or vice-versa. In some such examples, a first scheduled CW may refer to a CW whose scheduling parameters are listed first in the DCI and a second scheduled CW may refer to a CW whose scheduling parameters are listed second in the DCI. Additionally or alternatively, a first scheduled CW may refer to a CW that is mapped to the one or more first spatial layers 345 and a second scheduled CW may refer to a CW that is mapped to the one or more second spatial layers 350.

In some examples, the c-CW 335 may be mapped to the scheduled CW with a smaller MCS index value and p-CW is mapped to the scheduled CW with a larger MCS index value. Additionally or alternatively, the c-CW 335 may be mapped to the scheduled CW with a smaller quantity of layers and the p-CW 340 may be mapped to the scheduled CW with a larger quantity of layers.

In some examples, the control signaling 320 may include a field that may indicate whether the first or second scheduled CW corresponds to the c-CW 335 or the p-CW 340. For example, the control signaling 320 may include a 1-bit field to indicate one of the two possibilities: first, that the first CW is the c-CW 335 and the second CW is the p-CW 340; or second, that the first CW is the p-CW 340 and the second CW is the c-CW 335. Additionally or alternatively, the control signaling 320 may include a 2-bit field or two 1-bit fields to jointly indicate whether the two scheduled CWs are a c-CW and a p-CW of a rate-splitting scheme (for example, whether rate splitting MIMO is scheduled) and, if so, one of the two possibilities: first, that the first CW is the c-CW 335 and the second CW is the p-CW 340; or second, that the first CW is the p-CW 340 and the second CW is the c-CW 335. An example of a DCI format that may include such a field is shown in Table 1.

TABLE 1

| DCI Format (UE-specific) | Bits |
| --- | --- |
| DCI format identifier | 1 |
| BWP indicator | 2 |
| Frequency-domain RA | 12 |
| Time-domain RA | 4 |
| VRB-to-PRB | 1 |
| PRB bundling size | 1 |
| Rate-matching indicator | 2 |
| MCS for TB1 | 5 |
| NDI for TB1 | 1 |
| RV for TB1 | 2 |
| MCS for TB2 | 5 |
| NDI for TB2 | 1 |
| RV for TB2 | 2 |
| HARQ process number | 4 |
| DAI | 2 |
| TPC command for PUCCH | 2 |
| PUCCH resource indicator | 3 |
| PDSCH-to-HARQ indicator | 3 |
| Antenna port(s) | 6 |
| DMRS seq init | 1 |
| SRS request | 2 |
| Other fields are not present: CIF, ZP-CSI-RS indicator, TCI, CBGTI/CBGFI, priority indicator, among other examples. | 0 |
| CRC | 24 |
| Total | 86 |

In some examples, the control signaling 320 may be two-stage control signaling (for example, a two-stage DCI) that the network entity 105-a transmits to schedule the PDSCH message 325. A first stage of the control signaling 320 may be group common control signaling (for example, group common DCI (GC-DCI)) that may indicate parameters that are the same across multiple UEs, parameters that are the same between the c-CW 335 and the p-CW 340, or both. For example, such parameters may include one or more of MCS parameters, NDI parameters, RV parameters, frequency domain resource allocations (FDRAs), time domain resource allocations (TDRAs), or HARQ IDs. In some examples, one or more of MCS parameters, NDI parameters, or RV parameters may be parameters associated with the c-CW 335 and may be common or shared between multiple UEs or may be common parameters for both the c-CW 335 and the p-CW 340. In some examples, one or more of FDRA parameters, TRDA parameters, HARQ IDs, or other parameters may be separately indicated for the c-CW 335 and the p-CW 340 and may not be shared or applicable to both the c-CW 335 and the p-CW 340. In some examples, multiple co-scheduled UEs (including the UE 115-a) may decode the first stage of the control signaling 320, and the first stage of the control signaling may reuse MBS DCI formats that may be scrambled with a G-RNTI (for example, DCI formats 4_1 or 4_2). An example of such a first-stage DCI format is shown in Table 2.

TABLE 2

| DCI Format (GC-DCI) | Bits |
| --- | --- |
| Frequency-domain RA | 12 |
| Time-domain RA | 4 |
| VRB-to-PRB | 1 |
| PRB bundling size | 1 |
| Rate-matching indicator | 2 |
| MCS for TB1 | 5 |
| NDI for TB1 | 1 |
| RV for TB1 | 2 |
| HARQ process number | 4 |
| DAI | 2 |
| PUCCH resource indicator | 3 |
| PDSCH-to-HARQ indicator | 3 |
| Antenna port(s) | 4 |
| DMRS seq init | 1 |
| Other fields are not present: ZP-CSI-RS indicator, TCI, priority indicator, enable/disable HARQ-Ack, among other examples. | 0 |
| CRC | 24 |
| Total | 69 |

A second stage of the control signaling 320 may be UE-specific control signaling (for example, DCI) to indicate parameters specific to the p-CW 340. The second stage of the control signaling 320 may include at least one or more of MCS parameters, NDI parameters, RV parameters, DMRS ports specific to the p-CW 340 for the UE 115-a. Such a second stage of the control signaling 320 may use a format (for example, a DCI format) that has not previously been used or defined in wireless communications standards. For example, the new DCI format may not include one or more of FDRA, TDRA, HARQ-ID, or other parameters (for example, because they may be included in the first stage of the control signaling 320). An example of such a new DCI format is shown in Table 3.

TABLE 3

| DCI Format (UE-specific) | Bits |
| --- | --- |
| MCS for private CW | 5 |
| NDI for private CW | 1 |
| RV for private CW | 2 |
| Antenna port(s) for private CW | 4 |
| DMRS seq init for private CW | 1 |
| VRB-to-PRB* | 1 |
| PRB bundling size* | 1 |
| DAI* | 2 |
| PUCCH resource indicator* | 3 |
| PDSCH-to-HARQ indicator* | 3 |
| CRC | 24 |
| Total | 47 |

(*optional fields)

In such approaches, the UE 115-a decodes the first stage control signaling 320. In examples in which the UE 115-a does not decode it, the UE 115-*a* may not be able to obtain the c-CW 335, the p-CW 340, or both. In some examples, this may mean that the second stage control signaling 320 may not be self-contained or independent.

Figure 4:
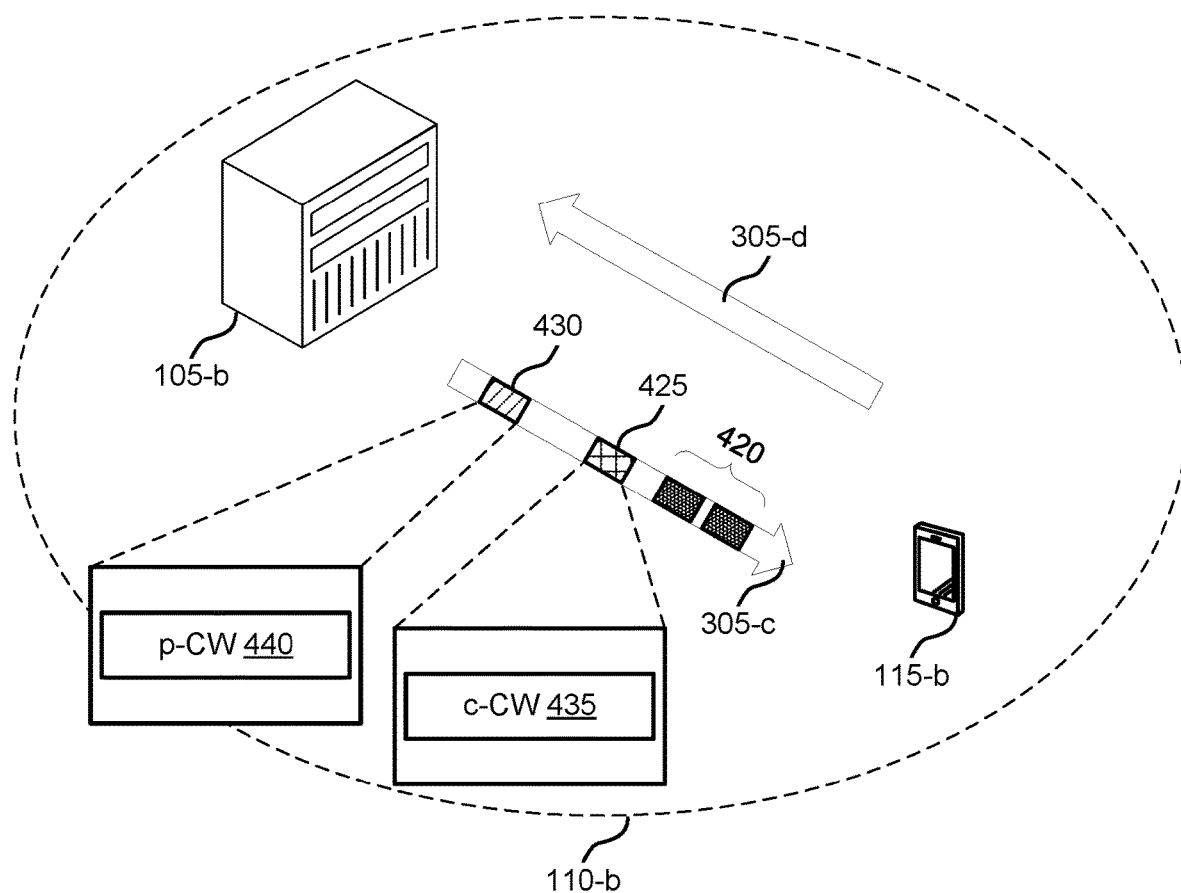
FIG. 4 illustrates an example of a wireless communications system that supports a signaling framework for rate splitting in accordance with one or more aspects of the present disclosure.

FIG. 4 illustrates an example of a wireless communications system 400 that supports a signaling framework for rate splitting in accordance with one or more aspects of the present disclosure. The wireless communications system 400 may involve the network entity 105-*b* that may be an example of one or more network entities discussed in relation to other figures. The wireless communications system 400 may involve the UE 115-*b* that may be an example of UEs discussed in relation to other figures. In some examples, the UE 115-*b* may be located in a geographic coverage area 110-*b* that may be associated with the network entity 105-*b*. The network entity 105-*b* and UE 115-*b* may communicate via one or more downlink communication links 305-*c* and one or more uplink communication links 305-*d*.

In some examples, the network entity 105-*b* may transmit a first PDSCH message 425 and a second PDSCH message 430 to the UE 115-*b*. The first PDSCH message 425 may contain the c-CW 435 and second PDSCH message 430 may contain the p-CW 440. In some examples, first PDSCH message 425 and the second PDSCH message 430 may at least partially overlap in time, in frequency, or both. In some examples, the first PDSCH message 425 and the second PDSCH message 430 may completely overlap in time, in frequency, or both.

In some examples, the network entity 105-*b* may transmit the control signaling 420. The control signaling 420 may include first control signaling and second control signaling (for example, DCIs). A first DCI may be a GC-DCI for scheduling the first PDSCH message 425 that may be a GC-PDSCH and may carry the c-CW 435 that may be received by the UE 115-*b* and other devices (for example, other UEs) participating in a rate-splitting scheme. Such a first DCI may be received in a CORESET with a first CORESETPoolIndex value (for example, a value of 0) and may reuse an MBS DCI format that may be scrambled with G-RNTI (for example, DCI formats 4_1 or 4_2). In some examples, CORESETs associated with a control channel parameter (for example, PDCCH-config-Multicast) of a CFR may be configured with the first CORESETPoolIndex value (for example, a value of 0). An example of the first control signaling of a DCI format is depicted in Table 4.

TABLE 4

| DCI Format (GC-DCI) | Bits |
|---|---|
| Frequency-domain RA | 12 |
| Time-domain RA | 4 |
| VRB-to-PRB | 1 |
| PRB bundling size | 1 |
| Rate-matching indicator | 2 |
| MCS for TB1 | 5 |
| NDI for TB1 | 1 |
| RV for TB1 | 2 |
| HARQ process number | 4 |
| DAI | 2 |
| PUCCH resource indicator | 3 |
| PDSCH-to-HARQ indicator | 3 |
| Antenna port(s | 4 |

TABLE 4-continued

| DCI Format (GC-DCI) | Bits |
|---|---|
| DMRS seq init | 1 |
| Other fields are not present: ZP-CSI-RS indicator, TCI, priority indicator, enable/disable HARQ-Ack, among other examples. | 0 |
| CRC | 24 |
| Total | 69 |

In some examples, the control signaling 420 may include second control signaling that may be UE-specific and may schedule the second PDSCH message 430 that carries the p-CW 440 for the UE 115-*b*. In some examples, the second control signaling may be of a DCI format (for example, DCI format 1_0, 1_1, or 1_2). The UE 115-*b* may receive the second control signaling in a CORESET with a second CORESETPoolIndex value (for example, a value of 1). In some examples, CORESETs not in or associated with a control channel parameter (for example, PDCCH-config-Multicast) of a CFR (for example, CORESETs in PDCCH-config for unicast) may be configured with the second CORESETPoolIndex value (for example, a value of 1). An example of the second control signaling of a DCI format is depicted in Table 5.

TABLE 5

| DCI Format (UE-specific) | Bits |
|---|---|
| DCI format identifier | 1 |
| BWP indicator | 2 |
| Frequency-domain RA | 12 |
| Time-domain RA | 4 |
| VRB-to-PRB | 1 |
| PRB bundling size | 1 |
| Rate-matching indicator | 2 |
| MCS for TB1 | 5 |
| NDI for TB1 | 1 |
| RV for TB1 | 2 |
| MCS for TB2 | 0 |
| NDI for TB2 | 0 |
| RV for TB2 | 0 |
| HARQ process number | 4 |
| DAI | 2 |
| TPC command for PUCCH | 2 |
| PUCCH resource indicator | 3 |
| PDSCH-to-HARQ indicator | 3 |
| Antenna port(s) | 4 |
| DMRS seq init | 1 |
| SRS request | 2 |
| Other fields are not present: CIF, ZP-CSI-RS indicator, TCI, CBGTI/CBGFI, priority indicator, among other examples. | 0 |
| CRC | 24 |
| Total | 76 |

In some examples, the first control signaling and the second control signaling may be self-contained, but the UE 115-*b* may decode both the first control signaling and the second control signaling to perform successive interference cancelation or joint demodulation/decoding using the c-CW 435 and the p-CW 440. However, even in examples in which the UE 115-*b* does not decode the first control signaling, the UE 115-*b* may still decode the p-CW 440 carried in the second PDSCH message 430, even without performing successive interference cancelation or without joint demodulation/decoding. For example, the UE 115-*b* may still receive or decode one of the first PDSCH message 425 or the second PDSCH message 430 even in examples in which the UE 115-*b* does not detect or receive both the first control signaling and the second control signaling. This may be possible because the first control signaling and the second control signaling may be self-contained (for example, with respect to scheduling information). However, in such a case, the UE 115-*b* may not be able to perform successive interference cancelation or joint demodulation/decoding.

In some examples, the second control signaling may include a field (for example, a new field not discussed in wireless communications standards) to indicate the presence of the c-CW 435 on the same resources as the scheduled p-CW 440. In some examples, the UE 115-*b* may use this field to identify or determine whether successive interference cancelation or joint demodulation/decoding of the first PDSCH message 425 and the second PDSCH message 430 may be performed. For example, in examples in which the UE 115-*b* detects the second control signaling and the new field or flag indicates the presence of the c-CW 435 but the first control signaling is not detected, the UE 115-*b* UE may not decode the p-CW 440 to save power (for example, because the likelihood of successful decoding of the p-CW 440 is small as the UE 115-*b* cannot perform successive interference cancelation or joint demodulation/decoding. As another example, the new field or flag may be used by the UE 115-*b* to validate that the first control signaling and the second control signaling are related (for example, that the corresponding scheduled PDSCHs can be processed jointly).

In some examples, the first control signaling may include a field (for example, a new field not discussed in wireless communications standards) to indicate the presence of the p-CW 440 on the same resources of the scheduled c-CW 435. Such a field may be used as an alternative to or in addition to other fields discussed herein. In some examples, the new field or flag may be used by the UE 115-*b* to validate that the first control signaling and the second control signaling are related (for example, that the corresponding scheduled PDSCHs can be processed jointly).

In some examples, the UE 115-*b* may determine whether the first DCI and the second DCI are related (for example, whether the corresponding scheduled PDSCHs, such as the first PDSCH message 425 and the second PDSCH message 430, may be processed jointly) based on determining that some control signaling fields indicate the same scheduling parameters such as time/frequency resources (for example, FDRA, TDRA, or both).

Figure 5:
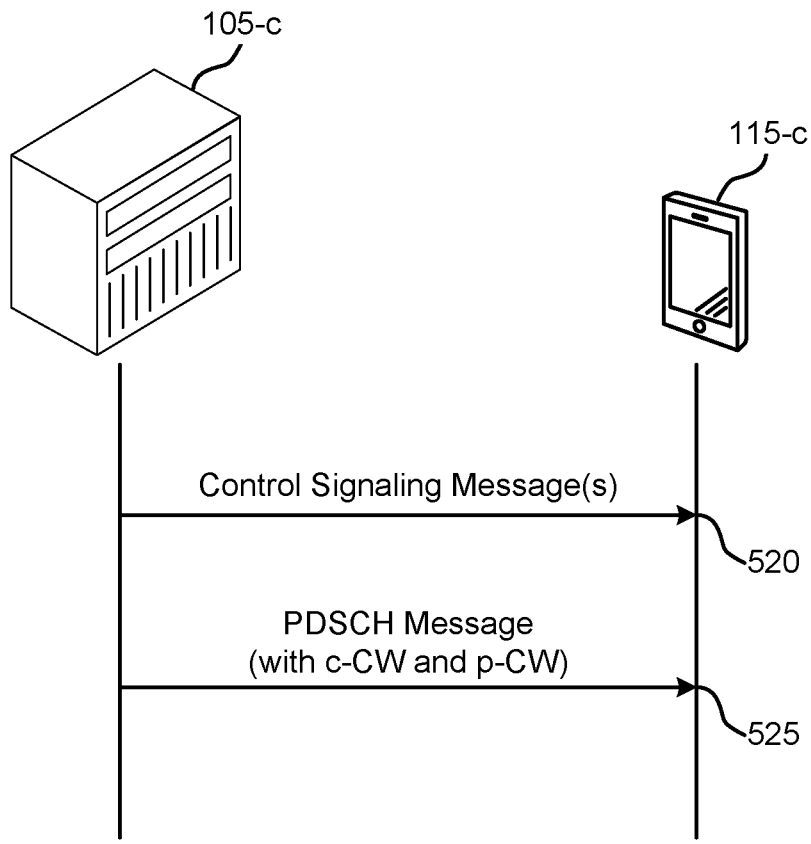
FIG. 5 illustrates an example of a process flow that supports a signaling framework for rate splitting in accordance with one or more aspects of the present disclosure.

FIG. 5 illustrates an example of a process flow 500 that supports a signaling framework for rate splitting in accordance with one or more aspects of the present disclosure. In particular, a signaling framework using a single PDSCH message is described. The process flow 500 may implement various aspects of the present disclosure described herein. The elements described in the process flow 500 may be examples of similarly-named elements described herein.

In the following description of the process flow 500, the operations between the various entities or elements may be performed in different orders or at different times. Some operations may also be left out of the process flow 500, or other operations may be added. Although the various entities or elements (for example, network entity 105-*c* and UE 115-*c*) are shown performing the operations of the process flow 500, some aspects of some operations may also be performed by other entities or elements of the process flow 500 or by entities or elements that are not depicted in the process flow, or any combination thereof.

At 520, the UE 115-*c* may receive one or more control signaling messages that may include: one or more first scheduling parameters for a common codeword associated with downlink data for the first UE and with downlink data for a second UE, and one or more second scheduling parameters for a private codeword associated with additional downlink data for the first UE.

In some examples, the one or more first scheduling parameters include a first modulation and coding scheme associated with the common codeword. In some examples, the one or more second scheduling parameters include a second modulation and coding scheme associated with the private codeword. In some examples, a first modulation and coding scheme index value associated with the first modulation and coding scheme may be less than a second modulation and coding scheme index value associated with the second modulation and coding scheme.

In some examples, a first control signaling message of the one or more control signaling messages may include one or more fields having one or more values that indicate the common codeword may be mapped to the one or more first layers of the physical downlink shared channel message, the private codeword may be mapped to the one or more second layers of the physical downlink shared channel message, or both. In some examples, the one or more fields include a second value that may indicate that the common codeword and the private codeword are to be received in the physical downlink shared channel message.

In some examples, the one or more control signaling messages include a first control signaling message that schedules transmission of the common codeword and a second control signaling message that schedules transmission of the private codeword. In some examples, the first control signaling message may be a group common control signaling message for a plurality of UEs, including the UE, and the second control signaling message may be for the first UE.

In some examples, the first control signaling message may include common parameters for the first UE and the second UE, common parameters for the common codeword and the private codeword, or both. In some examples, the second control signaling message may include one or more parameters that may be associated with the private codeword and specific to the first UE.

In some examples, the second control signaling message omits one or more parameters, included in the first control signaling message, that may be associated with both the common codeword and the private codeword.

In some examples, the one or more first scheduling parameters, the one or more second scheduling parameters, or both, include a modulation and coding scheme, a new data indicator, a redundancy version, one or more demodulation signal reference ports, a frequency domain resource allocation, a time domain resource allocation, a hybrid automatic repeat request identifier, or any combination thereof.

At 525, the UE 115-*c* may receive, based on the one or more first scheduling parameters and the one or more second scheduling parameters, a physical downlink shared channel message that may include the common codeword mapped to one or more first layers of the physical downlink shared channel message and the private codeword mapped to one or more second layers of the physical downlink shared channel message.

In some examples, a quantity of the one or more first layers of the physical downlink shared channel message may be less than a quantity of the one or more second layers of the physical downlink shared channel message.

In some examples, the downlink data for the first UE may include a first portion of one or more downlink messages for the first UE and the additional downlink data for the first UE may include a second portion of the one or more downlink messages for the first UE. In some examples, an allocation of bits between the first portion and the second portion may be based on a first channel quality associated with the common codeword and a second channel quality associated with the private codeword.

Figure 6:
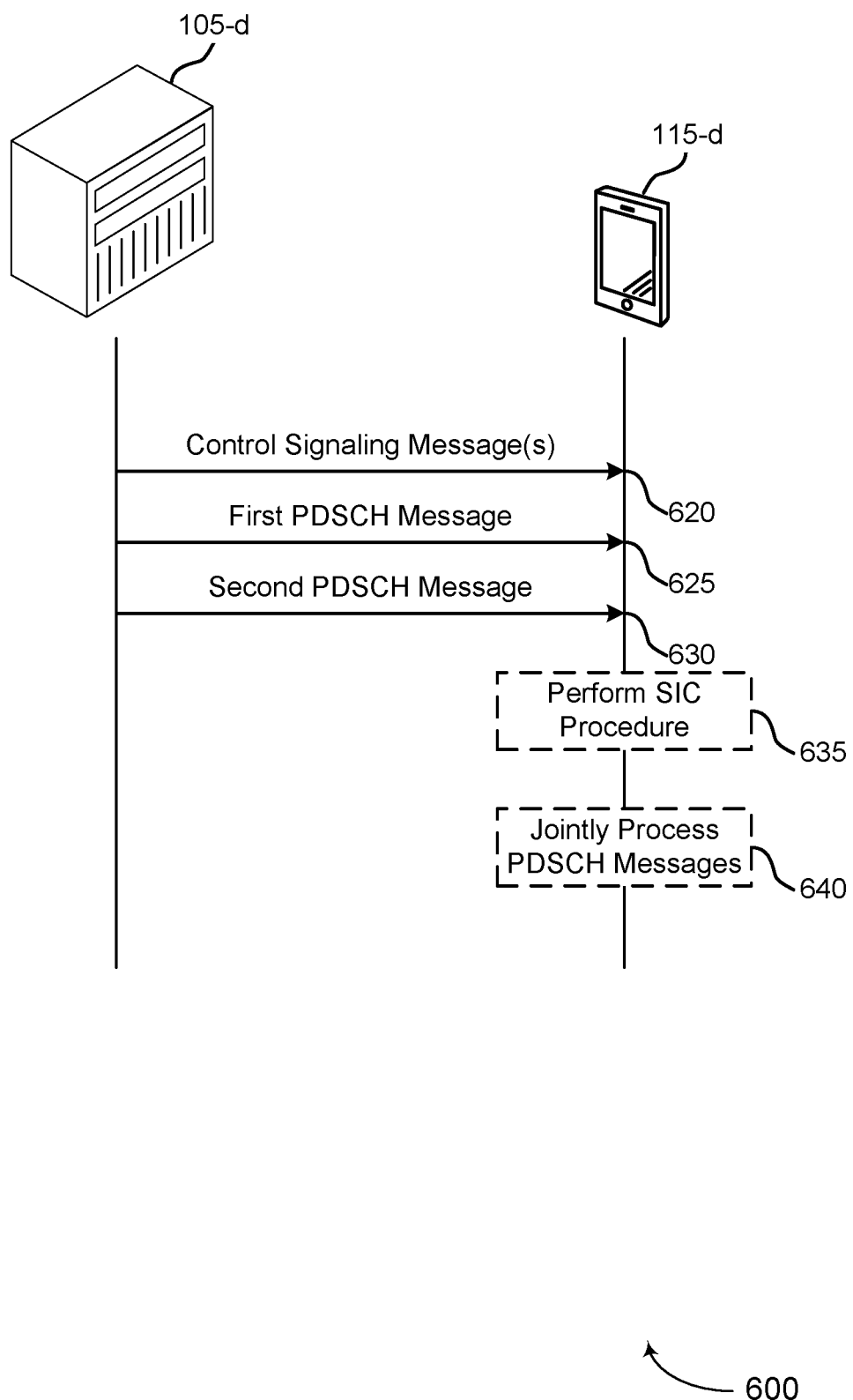
FIG. 6 illustrates an example of a process flow that supports a signaling framework for rate splitting in accordance with one or more aspects of the present disclosure.

FIG. 6 illustrates an example of a process flow 600 that supports a signaling framework for rate splitting in accordance with one or more aspects of the present disclosure. In particular, a signaling framework using a single PDSCH message is described. The process flow 600 may implement various aspects of the present disclosure described herein. The elements described in the process flow 600 may be examples of similarly-named elements described herein.

In the following description of the process flow 600, the operations between the various entities or elements may be performed in different orders or at different times. Some operations may also be left out of the process flow 600, or other operations may be added. Although the various entities or elements (for example, network entity 105-d and UE 115-d) are shown performing the operations of the process flow 600, some aspects of some operations may also be performed by other entities or elements of the process flow 600 or by entities or elements that are not depicted in the process flow, or any combination thereof.

At 620, the UE 115-d may receive one or more control signaling messages including one or more first scheduling parameters for a common codeword associated with downlink data for the first UE and downlink data for a second UE, and one or more second scheduling parameters for a private codeword associated with additional downlink data for the first UE.

In some examples, the one or more control signaling messages include a first control signaling message scheduling transmission of the common codeword and a second control signaling message scheduling transmission of the private codeword. In some examples, the first control signaling message schedules transmission of the first physical downlink shared channel message and the second control signaling message schedules transmission of the second physical downlink shared channel message. In some examples, the first control signaling message is a group common control signaling message and the second control signaling message is for the first UE.

In some examples, the first control signaling message may be in a first control resource set associated with a first control resource set pool index value and the second control signaling message may be in a second control resource set associated with a second control resource set pool index value.

In some examples, the first control signaling message may include a field having a first value that indicates that the private codeword is to be received by the first UE over the second set of time and frequency resources. In some examples, the second control signaling message may include a field having a first value that indicates that the common codeword is to be received by the first UE over the first set of time and frequency resources.

At 625, the UE 115-d may receive, in a first set of time and frequency resources and based on the one or more first scheduling parameters, a first physical downlink shared channel message that may include the common codeword.

In some examples, receiving the first physical downlink shared channel message may be based on the interference cancelation procedure.

At 630, the UE 115-d may receive, in a second set of time and frequency resources that at least partially overlaps with the first set of time and frequency resources and based on the one or more second scheduling parameters, a second physical downlink shared channel message that may include the private codeword. In some examples, receiving the second physical downlink shared channel message may be based on the interference cancelation procedure.

In some examples, the first set of time and frequency resources and the second set of time and frequency resources completely overlap. In some examples, the downlink data for the UE may include a first portion of one or more downlink messages for the UE and the additional downlink data for the UE may include a second portion of the one or more downlink messages for the UE. In some examples, an allocation of bits between the first portion and the second portion may be based on a first channel quality associated with the common codeword and a second channel quality associated with the private codeword.

At 635, the UE 115-d may perform an interference cancelation procedure that may include: decoding the common codeword; subtracting, from a combined signal that may include the common codeword and the private codeword, a portion of the combined signal corresponding to the common codeword; and decoding the private codeword based on a remaining portion of the combined signal that corresponds to the private codeword.

At 640, the UE 115-d may jointly process the first physical downlink shared channel message and the second physical downlink shared channel message based on one or more scheduling parameters of the one or more first scheduling parameters and the one or more second scheduling parameters being common.

Figure 7:
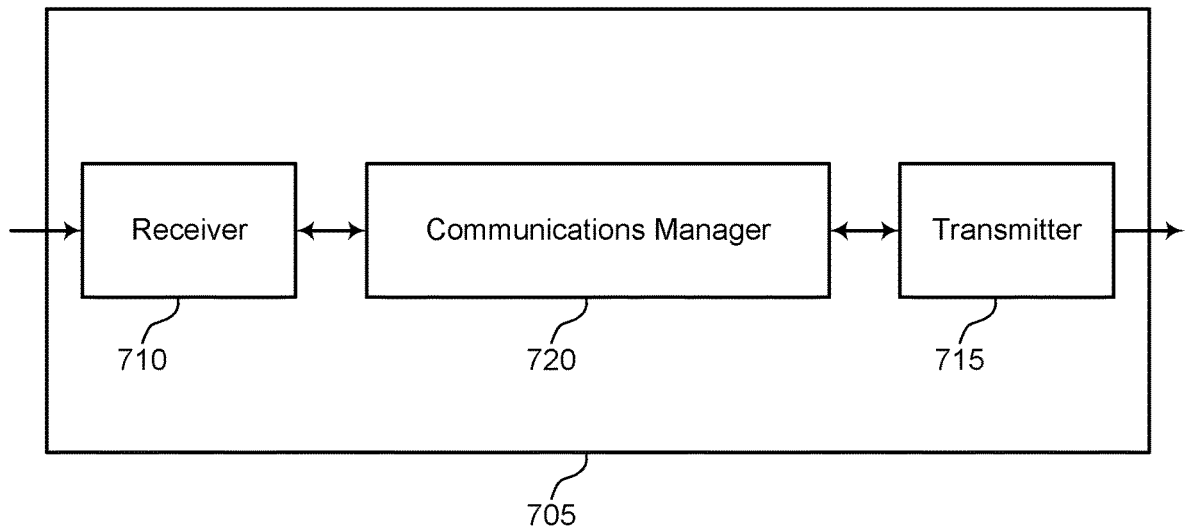
FIGS. 7 and 8 show block diagrams of devices that support a signaling framework for rate splitting in accordance with one or more aspects of the present disclosure.

FIG. 7 shows a block diagram of a device 705 that supports a signaling framework for rate splitting in accordance with one or more aspects of the present disclosure. The device 705 may be an example of aspects of a UE 115 as described herein. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to a signaling framework for rate splitting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to a signaling framework for rate splitting). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of a signaling framework for rate splitting as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (for example, in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 720, the receiver 710, the transmitter 715, or various combinations or components thereof may be implemented in code (for example, as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 720 may be configured to perform various operations (for example, receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. For example, the communications manager 720 may be configured as or otherwise support a means for receiving one or more control signaling messages including. In some examples, to, the communications manager 720 may be configured as or otherwise support a means for one or more first scheduling parameters for a common codeword associated with downlink data for the first UE and with downlink data for a second UE and one or more second scheduling parameters for a private codeword associated with additional downlink data for the first UE. The communications manager 720 may be configured as or otherwise support a means for receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

Additionally, or alternatively, the communications manager 720 may support wireless communication at a first UE in accordance with examples as disclosed herein. For example, the communications manager 720 may be configured as or otherwise support a means for receiving one or more control signaling messages including one or more first scheduling parameters for a common codeword associated with downlink data for the first UE and downlink data for a second UE, and one or more second scheduling parameters for a private codeword associated with additional downlink data for the first UE. The communications manager 720 may be configured as or otherwise support a means for receiving, in a first set of time and frequency resources and based on the one or more first scheduling parameters, a first physical downlink shared channel message including the common codeword. The communications manager 720 may be configured as or otherwise support a means for receiving, in a second set of time and frequency resources that at least partially overlaps with the first set of time and frequency resources and based on the one or more second scheduling parameters, a second physical downlink shared channel message including the private codeword.

By including or configuring the communications manager 720 in accordance with examples as described herein, the device 705 (for example, a processor controlling or otherwise coupled with the receiver 710, the transmitter 715, the communications manager 720, or a combination thereof) may support techniques for reduced processing, reduced power consumption, more efficient utilization of communication resources, or any combination thereof.

Figure 8:
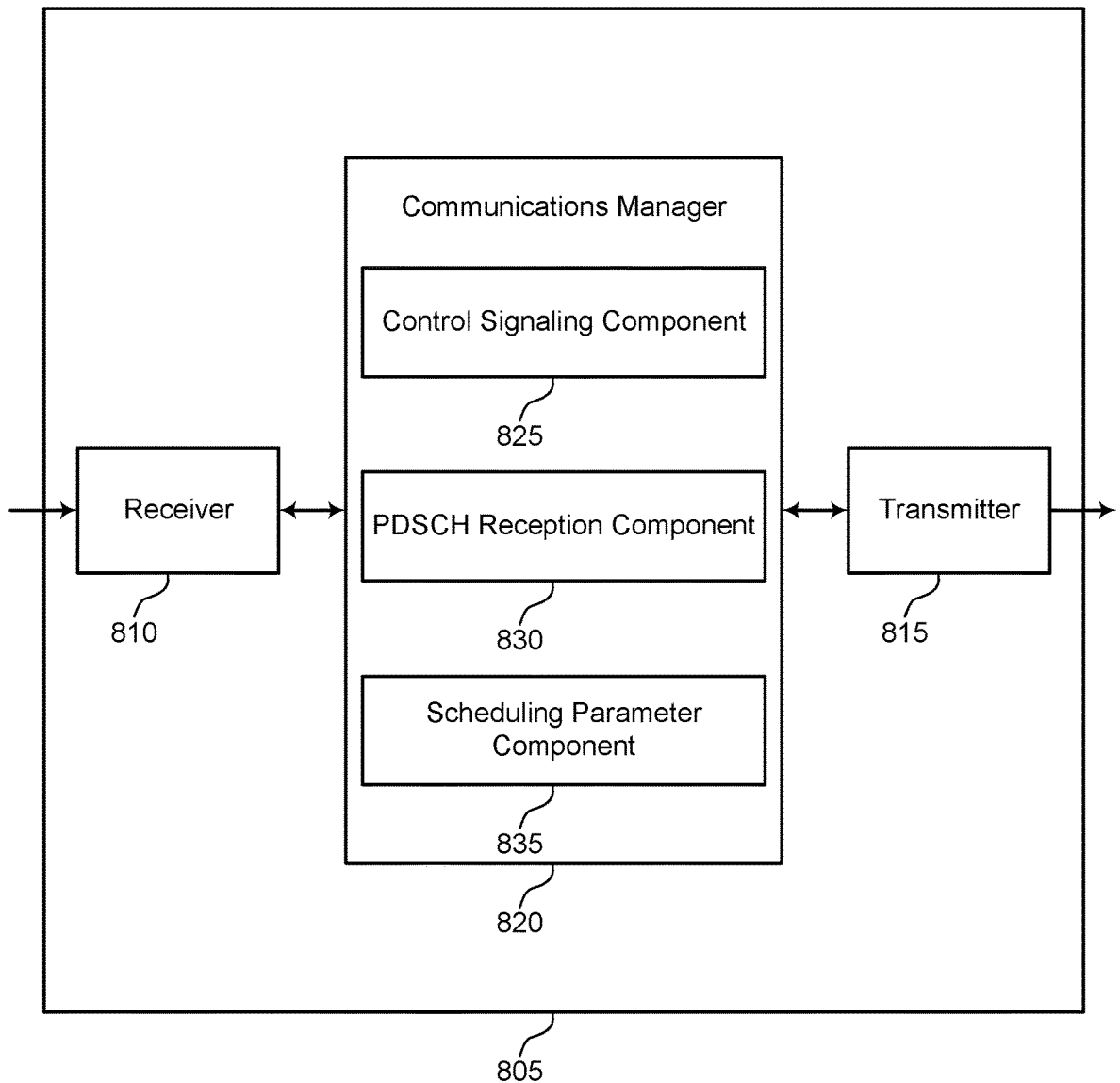

FIG. 8 shows a block diagram of a device 805 that supports a signaling framework for rate splitting in accordance with one or more aspects of the present disclosure. The device 805 may be an example of aspects of a device 705 or a UE 115 as described herein. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to a signaling framework for rate splitting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to a signaling framework for rate splitting). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of a signaling framework for rate splitting as described herein. For example, the communications manager 820 may include a control signaling component 825 an PDSCH reception component 830, or any combination thereof. In some examples, the communications manager 820, or various components thereof, may be configured to perform various operations (for example, receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. The control signaling component 825 may be configured as or otherwise support a means for receiving one or more control signaling messages including. In some examples, to, the scheduling parameter component 835 may be configured as or otherwise support a means for one or more first scheduling parameters for a common codeword associated with downlink data for the first UE and with downlink data for a second UE and the scheduling parameter component 835 may be configured as or otherwise support a means for one or more second scheduling parameters for a private codeword associated with additional downlink data for the first UE. The PDSCH reception component 830 may be configured as or otherwise support a means for receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

Additionally, or alternatively, the communications manager 820 may support wireless communication at a first UE in accordance with examples as disclosed herein. The control signaling component 825 may be configured as or otherwise support a means for receiving one or more control signaling messages including one or more first scheduling parameters for a common codeword associated with downlink data for the first UE and downlink data for a second UE, and one or more second scheduling parameters for a private codeword associated with additional downlink data for the first UE. The PDSCH reception component 830 may be configured as or otherwise support a means for receiving, in a first set of time and frequency resources and based on the one or more first scheduling parameters, a first physical downlink shared channel message including the common codeword. The PDSCH reception component 830 may be configured as or otherwise support a means for receiving, in a second set of time and frequency resources that at least partially overlaps with the first set of time and frequency resources and based on the one or more second scheduling parameters, a second physical downlink shared channel message including the private codeword.

Figure 9:
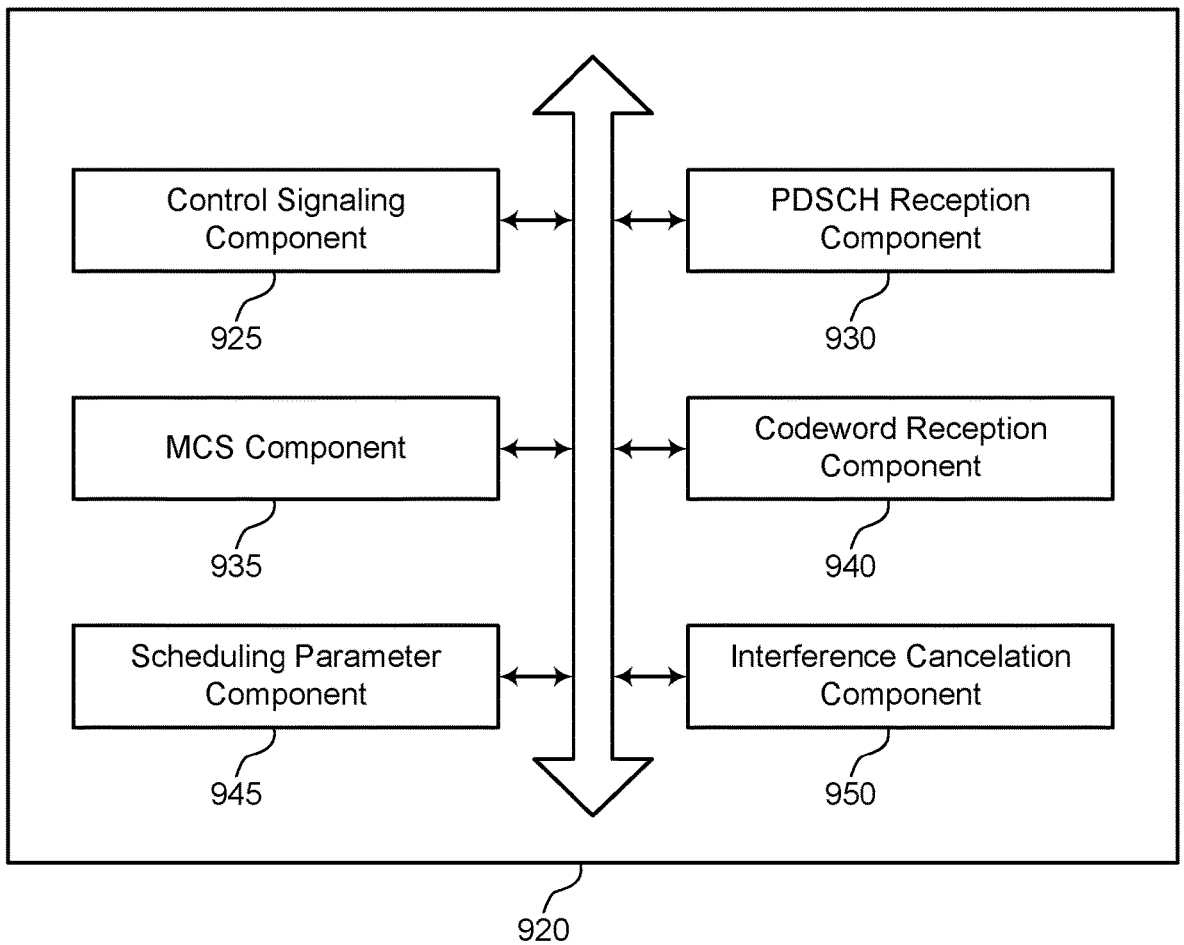
FIG. 9 shows a block diagram of a communications manager that supports a signaling framework for rate splitting in accordance with one or more aspects of the present disclosure.

FIG. 9 shows a block diagram of a communications manager 920 that supports a signaling framework for rate splitting in accordance with one or more aspects of the present disclosure. The communications manager 920, or various components thereof, may be an example of means for performing various aspects of a signaling framework for rate splitting as described herein. For example, the communications manager 920 may include a control signaling component 925, an PDSCH reception component 930, an MCS component 935, a codeword reception component 940, a scheduling parameter component 945, an interference cancelation component 950, or any combination thereof. Each of these components may communicate, directly or indirectly, with one another (for example, via one or more buses).

The communications manager 920 may support wireless communication at a first UE in accordance with examples as disclosed herein. The control signaling component 925 may be configured as or otherwise support a means for receiving one or more control signaling messages including. In some examples the scheduling parameter component 945 may be configured as or otherwise support a means for one or more first scheduling parameters for a common codeword associated with downlink data for the first UE and with downlink data for a second UE and the scheduling parameter component 945 may be configured as or otherwise support a means for one or more second scheduling parameters for a private codeword associated with additional downlink data for the first UE. The PDSCH reception component 930 may be configured as or otherwise support a means for receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

In some examples, the one or more first scheduling parameters include a first modulation and coding scheme associated with the common codeword. In some examples, the one or more second scheduling parameters include a second modulation and coding scheme associated with the private codeword. In some examples, a first modulation and coding scheme index value associated with the first modulation and coding scheme is less than a second modulation and coding scheme index value associated with the second modulation and coding scheme.

In some examples, a quantity of the one or more first layers of the physical downlink shared channel message is less than a quantity of the one or more second layers of the physical downlink shared channel message.

In some examples, a first control signaling message of the one or more control signaling messages includes one or more fields having one or more values that indicate the common codeword is mapped to the one or more first layers of the physical downlink shared channel message, the private codeword is mapped to the one or more second layers of the physical downlink shared channel message, or both.

In some examples, the one or more fields include a second value that indicates that the common codeword and the private codeword are to be received in the physical downlink shared channel message.

In some examples, the one or more control signaling messages include a first control signaling message that schedules transmission of the common codeword and a second control signaling message that schedules transmission of the private codeword. In some examples, the first control signaling message is a group common control signaling message for a set of multiple UEs, including the UE, and the second control signaling message is for the first UE.

In some examples, the first control signaling message includes common parameters for the first UE and the second UE, common parameters for the common codeword and the private codeword, or both.

In some examples, the second control signaling message includes one or more parameters that are associated with the private codeword and specific to the first UE.

In some examples, the second control signaling message omits one or more parameters, included in the first control signaling message, that are associated with both the common codeword and the private codeword.

In some examples, the one or more first scheduling parameters, the one or more second scheduling parameters, or both, include a modulation and coding scheme, a new data indicator, a redundancy version, one or more demodulation signal reference ports, a frequency domain resource allocation, a time domain resource allocation, a hybrid automatic repeat request identifier, or any combination thereof.

In some examples, the downlink data for the first UE includes a first portion of one or more downlink messages for the first UE and the additional downlink data for the first UE includes a second portion of the one or more downlink messages for the first UE. In some examples, an allocation of bits between the first portion and the second portion is based on a first channel quality associated with the common codeword and a second channel quality associated with the private codeword.

Additionally, or alternatively, the communications manager 920 may support wireless communication at a first UE in accordance with examples as disclosed herein. In some examples, the control signaling component 925 may be configured as or otherwise support a means for receiving one or more control signaling messages including one or more first scheduling parameters for a common codeword associated with downlink data for the first UE and downlink data for a second UE, and one or more second scheduling parameters for a private codeword associated with additional downlink data for the first UE. In some examples, the PDSCH reception component 930 may be configured as or otherwise support a means for receiving, in a first set of time and frequency resources and based on the one or more first scheduling parameters, a first physical downlink shared channel message including the common codeword. In some examples, the PDSCH reception component 930 may be configured as or otherwise support a means for receiving, in a second set of time and frequency resources that at least partially overlaps with the first set of time and frequency resources and based on the one or more second scheduling parameters, a second physical downlink shared channel message including the private codeword.

In some examples, the one or more control signaling messages include a first control signaling message scheduling transmission of the common codeword and a second control signaling message scheduling transmission of the private codeword.

In some examples, the first control signaling message is in a first control resource set associated with a first control resource set pool index value and the second control signaling message is in a second control resource set associated with a second control resource set pool index value.

In some examples, the interference cancelation component 950 may be configured as or otherwise support a means for performing an interference cancelation procedure including. In some examples the interference cancelation component 950 may be configured as or otherwise support a means for decoding the common codeword, the interference cancelation component 950 may be configured as or otherwise support a means for subtracting, from a combined signal including the common codeword and the private codeword, a portion of the combined signal corresponding to the common codeword, and the interference cancelation component 950 may be configured as or otherwise support a means for decoding the private codeword based on a remaining portion of the combined signal that corresponds to the private codeword. In some examples, the PDSCH reception component 930 may be configured as or otherwise support a means for where receiving the first physical downlink shared channel message, the second physical downlink shared channel message, or both, is based on the interference cancelation procedure.

In some examples, the second control signaling message includes a field having a first value that indicates that the common codeword is to be received by the first UE over the first set of time and frequency resources.

In some examples, the first control signaling message includes a field having a first value that indicates that the private codeword is to be received by the first UE over the second set of time and frequency resources.

In some examples, the first control signaling message schedules transmission of the first physical downlink shared channel message and the second control signaling message schedules transmission of the second physical downlink shared channel message, and the PDSCH reception component 930 may be configured as or otherwise support a means for jointly processing the first physical downlink shared channel message and the second physical downlink shared channel message based on one or more scheduling parameters of the one or more first scheduling parameters and the one or more second scheduling parameters being common.

In some examples, the first set of time and frequency resources and the second set of time and frequency resources completely overlap.

In some examples, the first control signaling message is a group common control signaling message and the second control signaling message is for the first UE.

In some examples, the downlink data for the UE includes a first portion of one or more downlink messages for the UE and the additional downlink data for the UE includes a second portion of the one or more downlink messages for the UE. In some examples, an allocation of bits between the first portion and the second portion is based on a first channel quality associated with the common codeword and a second channel quality associated with the private codeword.

Figure 10:
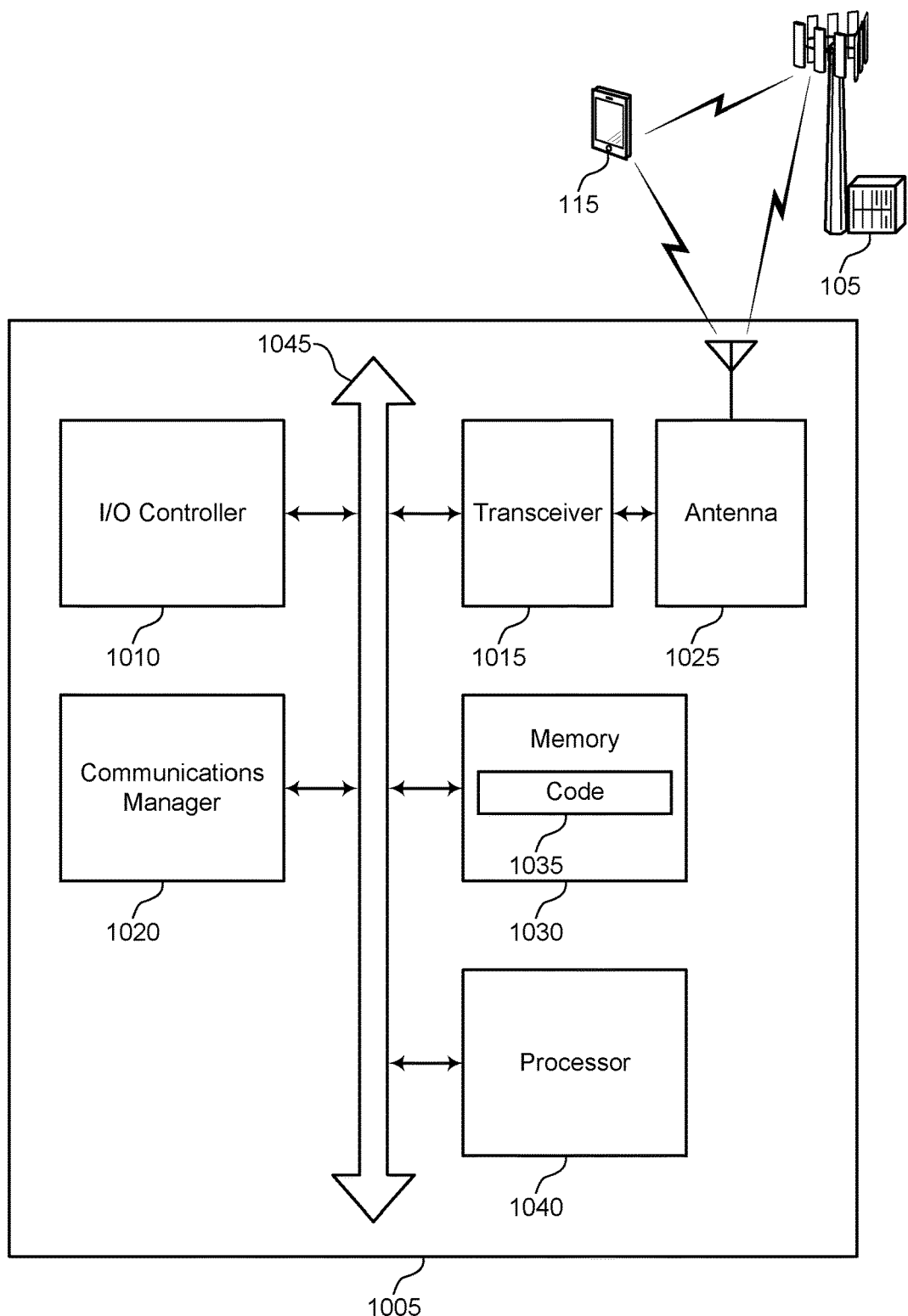
FIG. 10 shows a diagram of a system including a device that supports a signaling framework for rate splitting in accordance with one or more aspects of the present disclosure.

FIG. 10 shows a diagram of a system including a device 1005 that supports a signaling framework for rate splitting in accordance with one or more aspects of the present disclosure. The device 1005 may be an example of or include the components of a device 705, a device 805, or a UE 115 as described herein. The device 1005 may communicate (for example, wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (for example, operatively, communicatively, functionally, electronically, electrically) via one or more buses (for example, a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (for example, when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (for example, the memory 1030) to cause the device 1005 to perform various functions (for example, functions or tasks supporting a signaling framework for rate splitting). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for receiving one or more control signaling messages including. In some examples, to, the communications manager 1020 may be configured as or otherwise support a means for one or more first scheduling parameters for a common codeword associated with downlink data for the first UE and with downlink data for a second UE and one or more second scheduling parameters for a private codeword associated with additional downlink data for the first UE. The communications manager 1020 may be configured as or otherwise support a means for receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message.

Additionally, or alternatively, the communications manager 1020 may support wireless communication at a first UE in accordance with examples as disclosed herein. For example, the communications manager 1020 may be configured as or otherwise support a means for receiving one or more control signaling messages including one or more first scheduling parameters for a common codeword associated with downlink data for the first UE and downlink data for a second UE, and one or more second scheduling parameters for a private codeword associated with additional downlink data for the first UE. The communications manager 1020 may be configured as or otherwise support a means for receiving, in a first set of time and frequency resources and based on the one or more first scheduling parameters, a first physical downlink shared channel message including the common codeword. The communications manager 1020 may be configured as or otherwise support a means for receiving, in a second set of time and frequency resources that at least partially overlaps with the first set of time and frequency resources and based on the one or more second scheduling parameters, a second physical downlink shared channel message including the private codeword.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1020 may be configured to perform various operations (for example, receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of a signaling framework for rate splitting as described herein, or the processor 1040 and the memory 1030 may be otherwise configured to perform or support such operations.

Figure 11:
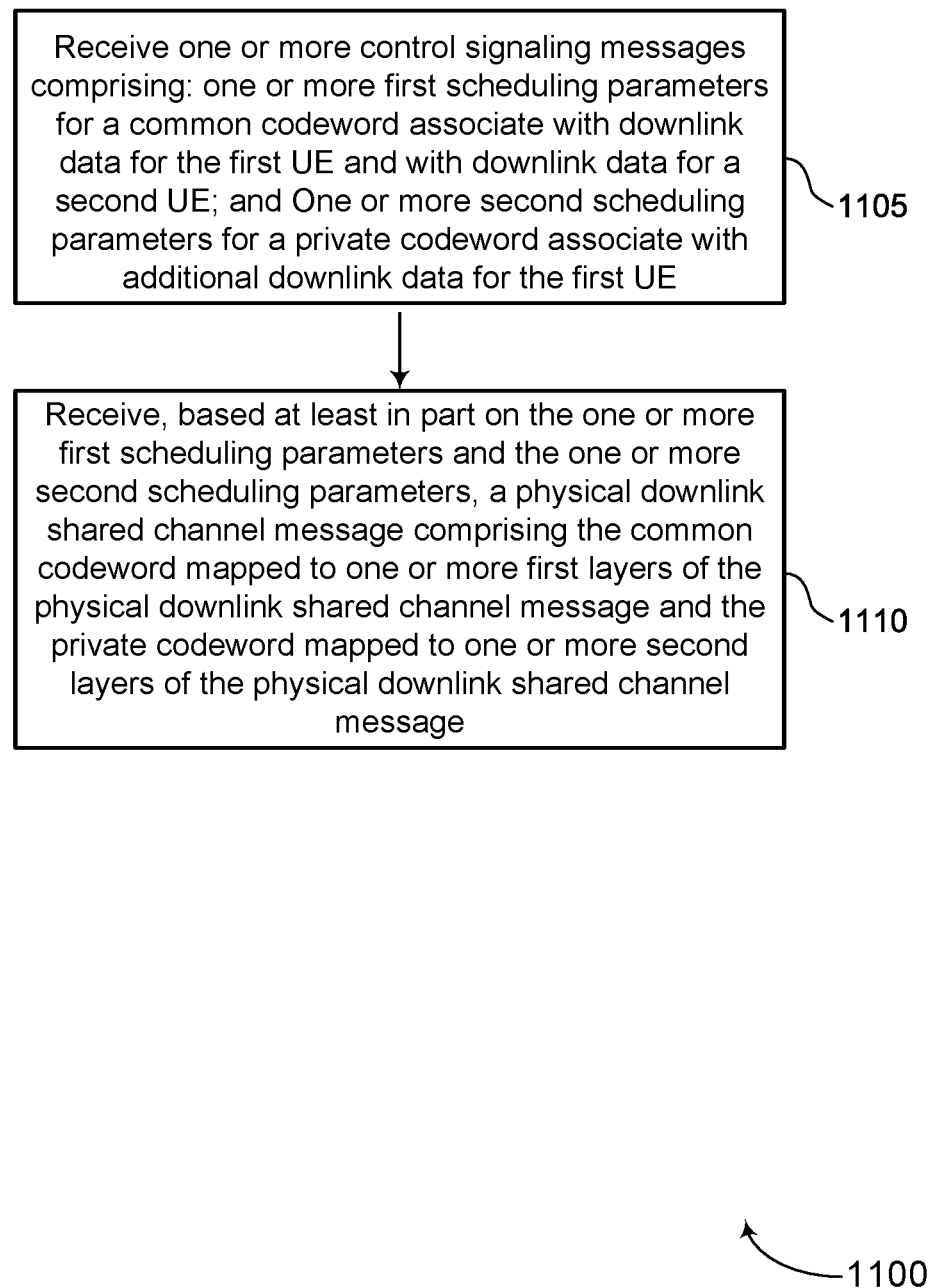
FIGS. 11 and 12 show flowcharts illustrating methods that support a signaling framework for rate splitting in accordance with one or more aspects of the present disclosure.

FIG. 11 shows a flowchart illustrating a method 1100 that supports a signaling framework for rate splitting in accordance with one or more aspects of the present disclosure. The operations of the method 1100 may be implemented by a UE or its components as described herein. For example, the operations of the method 1100 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1105, the method may include receiving one or more control signaling messages including. In some examples, may include one or more first scheduling parameters for a common codeword associated with downlink data for the first UE and with downlink data for a second UE and one or more second scheduling parameters for a private codeword associated with additional downlink data for the first UE. The operations of 1105 may be performed in accordance with examples as disclosed herein. In some examples, aspects of the operations of 1105 may be performed by a control signaling component 925 as described with reference to FIG. 9.

At 1110, the method may include receiving, based on the one or more first scheduling parameters and the one or more second scheduling parameters, a physical downlink shared channel message including the common codeword mapped to one or more first layers of the physical downlink shared channel message and the private codeword mapped to one or more second layers of the physical downlink shared channel message. The operations of 1110 may be performed in accordance with examples as disclosed herein. In some examples, aspects of the operations of 1110 may be performed by an PDSCH reception component 930 as described with reference to FIG. 9.

Figure 12:
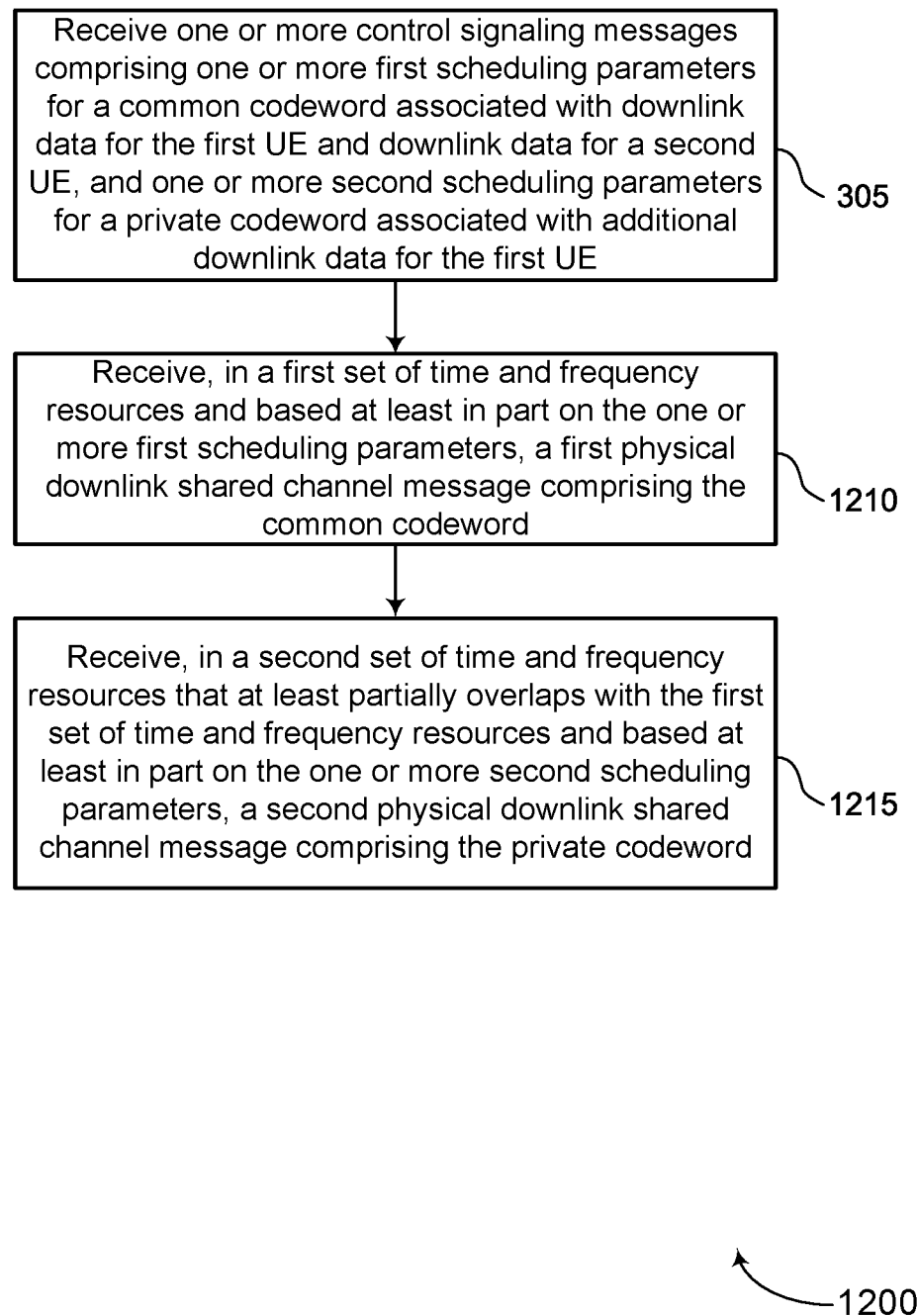

FIG. 12 shows a flowchart illustrating a method 1200 that supports a signaling framework for rate splitting in accordance with one or more aspects of the present disclosure. The operations of the method 1200 may be implemented by a UE or its components as described herein. For example, the operations of the method 1200 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1205, the method may include receiving one or more control signaling messages including one or more first scheduling parameters for a common codeword associated with downlink data for the first UE and downlink data for a second UE, and one or more second scheduling parameters for a private codeword associated with additional downlink data for the first UE. The operations of 1205 may be performed in accordance with examples as disclosed herein. In some examples, aspects of the operations of 1205 may be performed by a control signaling component 925 as described with reference to FIG. 9.

At 1210, the method may include receiving, in a first set of time and frequency resources and based on the one or more first scheduling parameters, a first physical downlink shared channel message including the common codeword. The operations of 1210 may be performed in accordance with examples as disclosed herein. In some examples, aspects of the operations of 1210 may be performed by an PDSCH reception component 930 as described with reference to FIG. 9.

At 1215, the method may include receiving, in a second set of time and frequency resources that at least partially overlaps with the first set of time and frequency resources and based on the one or more second scheduling parameters, a second physical downlink shared channel message including the private codeword. The operations of 1215 may be performed in accordance with examples as disclosed herein. In some examples, aspects of the operations of 1215 may be performed by an PDSCH reception component 930 as described with reference to FIG. 9.

The following provides an overview of aspects of the present disclosure:

Aspect 1: A method for wireless communication at a first UE, comprising: receiving one or more control signaling messages comprising: one or more first scheduling parameters for a common codeword associated with downlink data for the first UE and with downlink data for a second UE, and one or more second scheduling parameters for a private codeword associated with additional downlink data for the first UE; and receiving, based at least in part on the one or more first scheduling parameters and the one or more second scheduling parameters, a physical downlink shared channel message comprising the common codeword mapped to one or more first layers of the physical downlink shared channel message and the private codeword mapped to one or more second layers of the physical downlink shared channel message.

Aspect 2: The method of aspect 1, wherein the one or more first scheduling parameters comprise a first modulation and coding scheme associated with the common codeword; the one or more second scheduling parameters comprise a second modulation and coding scheme associated with the private codeword; and a first modulation and coding scheme index value associated with the first modulation and coding scheme is less than a second modulation and coding scheme index value associated with the second modulation and coding scheme.

Aspect 3: The method of any of aspects 1 through 2, wherein a quantity of the one or more first layers of the physical downlink shared channel message is less than a quantity of the one or more second layers of the physical downlink shared channel message.

Aspect 4: The method of any of aspects 1 through 3, wherein a first control signaling message of the one or more control signaling messages comprises one or more fields having one or more values that indicate the common codeword is mapped to the one or more first layers of the physical downlink shared channel message, the private codeword is mapped to the one or more second layers of the physical downlink shared channel message, or both.

Aspect 5: The method of aspect 4, wherein the one or more fields comprise a second value that indicates that the common codeword and the private codeword are to be received in the physical downlink shared channel message.

Aspect 6: The method of any of aspects 1 through 5, wherein the one or more control signaling messages comprise a first control signaling message that schedules transmission of the common codeword and a second control signaling message that schedules transmission of the private codeword; and the first control signaling message is a group common control signaling message for a plurality of UEs, including the UE, and the second control signaling message is for the first UE.

Aspect 7: The method of aspect 6, wherein the first control signaling message comprises common parameters for the first UE and the second UE, common parameters for the common codeword and the private codeword, or both.

Aspect 8: The method of any of aspects 6 through 7, wherein the second control signaling message comprises one or more parameters that are associated with the private codeword and specific to the first UE.

Aspect 9: The method of any of aspects 6 through 8, wherein the second control signaling message omits one or more parameters, included in the first control signaling message, that are associated with both the common codeword and the private codeword.

Aspect 10: The method of any of aspects 1 through 9, wherein the one or more first scheduling parameters, the one or more second scheduling parameters, or both, comprise a modulation and coding scheme, a new data indicator, a redundancy version, one or more demodulation signal reference ports, a frequency domain resource allocation, a time domain resource allocation, a hybrid automatic repeat request identifier, or any combination thereof.

Aspect 11: The method of any of aspects 1 through 10, wherein the downlink data for the first UE comprises a first portion of one or more downlink messages for the first UE and the additional downlink data for the first UE comprises a second portion of the one or more downlink messages for the first UE; and an allocation of bits between the first portion and the second portion is based at least in part on a first channel quality associated with the common codeword and a second channel quality associated with the private codeword.

Aspect 12: A method for wireless communication at a first UE, comprising: receiving one or more control signaling messages comprising one or more first scheduling parameters for a common codeword associated with downlink data for the first UE and downlink data for a second UE, and one or more second scheduling parameters for a private codeword associated with additional downlink data for the first UE; receiving, in a first set of time and frequency resources and based at least in part on the one or more first scheduling parameters, a first physical downlink shared channel message comprising the common codeword; and receiving, in a second set of time and frequency resources that at least partially overlaps with the first set of time and frequency resources and based at least in part on the one or more second scheduling parameters, a second physical downlink shared channel message comprising the private codeword.

Aspect 13: The method of aspect 12, wherein the one or more control signaling messages comprise a first control signaling message scheduling transmission of the common codeword and a second control signaling message scheduling transmission of the private codeword.

Aspect 14: The method of aspect 13, wherein the first control signaling message is in a first control resource set associated with a first control resource set pool index value and the second control signaling message is in a second control resource set associated with a second control resource set pool index value.

Aspect 15: The method of any of aspects 13 through 14, further comprising: performing an interference cancelation procedure comprising: decoding the common codeword, subtracting, from a combined signal comprising the common codeword and the private codeword, a portion of the combined signal corresponding to the common codeword, and decoding the private codeword based at least in part on a remaining portion of the combined signal that corresponds to the private codeword; and wherein receiving the first physical downlink shared channel message, the second physical downlink shared channel message, or both, is based at least in part on the interference cancelation procedure.

Aspect 16: The method of any of aspects 13 through 15, wherein the second control signaling message comprises a field having a first value that indicates that the common codeword is to be received by the first UE over the first set of time and frequency resources.

Aspect 17: The method of any of aspects 13 through 16, wherein the first control signaling message comprises a field having a first value that indicates that the private codeword is to be received by the first UE over the second set of time and frequency resources.

Aspect 18: The method of any of aspects 13 through 17, wherein the first control signaling message schedules transmission of the first physical downlink shared channel message and the second control signaling message schedules transmission of the second physical downlink shared channel message, the method further comprising: jointly processing the first physical downlink shared channel message and the second physical downlink shared channel message based at least in part on one or more scheduling parameters of the one or more first scheduling parameters and the one or more second scheduling parameters being common.

Aspect 19: The method of any of aspects 13 through 18, wherein the first set of time and frequency resources and the second set of time and frequency resources completely overlap.

Aspect 20: The method of any of aspects 13 through 19, wherein the first control signaling message is a group common control signaling message and the second control signaling message is for the first UE.

Aspect 21: The method of any of aspects 12 through 20, wherein the downlink data for the UE comprises a first portion of one or more downlink messages for the UE and the additional downlink data for the UE comprises a second portion of the one or more downlink messages for the UE; and an allocation of bits between the first portion and the second portion is based at least in part on a first channel quality associated with the common codeword and a second channel quality associated with the private codeword.

Aspect 22: An apparatus for wireless communication at a first UE, comprising a processor; memory coupled with the processor; and instructions stored in the memory and executable by the processor to cause the apparatus to perform a method of any of aspects 1 through 11.

Aspect 23: An apparatus for wireless communication at a first UE, comprising at least one means for performing a method of any of aspects 1 through 11.

Aspect 24: A non-transitory computer-readable medium storing code for wireless communication at a first UE, the code comprising instructions executable by a processor to perform a method of any of aspects 1 through 11.

Aspect 25: An apparatus for wireless communication at a first UE, comprising a processor; memory coupled with the processor; and instructions stored in the memory and executable by the processor to cause the apparatus to perform a method of any of aspects 12 through 21.

Aspect 26: An apparatus for wireless communication at a first UE, comprising at least one means for performing a method of any of aspects 12 through 21.

Aspect 27: A non-transitory computer-readable medium storing code for wireless communication at a first UE, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving one or more control signaling messages comprising:
      one or more first scheduling parameters for a common codeword associated with downlink data for the first UE and with downlink data for a second UE, and
      one or more second scheduling parameters for a private codeword associated with additional downlink data for the first UE, wherein an allocation of data between the downlink data and the additional downlink data is in accordance with one or more channel qualities; and
   receiving, in accordance with the one or more first scheduling parameters and the one or more second scheduling parameters, a physical downlink shared channel message comprising the common codeword mapped to one or more first layers of the physical downlink shared channel message and the private codeword mapped to one or more second layers of the physical downlink shared channel message.

2. The method of claim 1, wherein:
   the one or more first scheduling parameters comprise a first modulation and coding scheme associated with the common codeword;
   the one or more second scheduling parameters comprise a second modulation and coding scheme associated with the private codeword; and
   a first modulation and coding scheme index value associated with the first modulation and coding scheme is less than a second modulation and coding scheme index value associated with the second modulation and coding scheme.

3. The method of claim 1, wherein a quantity of the one or more first layers of the physical downlink shared channel message is less than a quantity of the one or more second layers of the physical downlink shared channel message.

4. The method of claim 1, wherein a first control signaling message of the one or more control signaling messages comprises one or more fields having one or more values that indicate the common codeword is mapped to the one or more first layers of the physical downlink shared channel message, the private codeword is mapped to the one or more second layers of the physical downlink shared channel message, or both.

5. The method of claim 4, wherein the one or more fields comprise a second value that indicates that the common codeword and the private codeword are to be received in the physical downlink shared channel message.

6. The method of claim 1, wherein:
   the one or more control signaling messages comprise a first control signaling message that schedules transmission of the common codeword and a second control signaling message that schedules transmission of the private codeword; and
   the first control signaling message is a group common control signaling message for a plurality of UEs, including the UE, and the second control signaling message is for the first UE.

7. The method of claim 6, wherein the first control signaling message comprises common parameters for the first UE and the second UE, common parameters for the common codeword and the private codeword, or both.

8. The method of claim 6, wherein the second control signaling message comprises one or more parameters that are associated with the private codeword and specific to the first UE.

9. The method of claim 6, wherein the second control signaling message omits one or more parameters, included in the first control signaling message, that are associated with both the common codeword and the private codeword.

10. The method of claim 1, wherein the one or more first scheduling parameters, the one or more second scheduling parameters, or both, comprise a modulation and coding scheme, a new data indicator, a redundancy version, one or more demodulation signal reference ports, a frequency domain resource allocation, a time domain resource allocation, a hybrid automatic repeat request identifier, or any combination thereof.

11. The method of claim 1, wherein:
   the downlink data for the first UE comprises a first portion of one or more downlink messages for the first UE and the additional downlink data for the first UE comprises a second portion of the one or more downlink messages for the first UE; and
   the allocation of data comprises an allocation of bits between the first portion and the second portion that is based at least in part on a first channel quality associated with the common codeword and a second channel quality associated with the private codeword.

12. A method for wireless communication at a first user equipment (UE), comprising:
   receiving one or more control signaling messages comprising one or more first scheduling parameters for a common codeword associated with downlink data for the first UE and downlink data for a second UE, and one or more second scheduling parameters for a private codeword associated with additional downlink data for the first UE;
   receiving, in a first set of time and frequency resources and in accordance with the one or more first scheduling parameters, a first physical downlink shared channel message comprising the common codeword, wherein an allocation of data between the downlink data and the additional downlink data is in accordance with one or more channel qualities; and
   receiving, in a second set of time and frequency resources that at least partially overlaps with the first set of time and frequency resources and in accordance with the one or more second scheduling parameters, a second physical downlink shared channel message comprising the private codeword.

13. The method of claim 12, wherein the one or more control signaling messages comprise a first control signaling message scheduling transmission of the common codeword and a second control signaling message scheduling transmission of the private codeword.

14. The method of claim 13, wherein the first control signaling message is in a first control resource set associated with a first control resource set pool index value and the second control signaling message is in a second control resource set associated with a second control resource set pool index value.

15. The method of claim 13, further comprising:
performing an interference cancelation procedure comprising:
decoding the common codeword,
subtracting, from a combined signal comprising the common codeword and the private codeword, a portion of the combined signal corresponding to the common codeword, and
decoding the private codeword in accordance with a remaining portion of the combined signal that corresponds to the private codeword; and
wherein receiving the first physical downlink shared channel message, the second physical downlink shared channel message, or both, is in accordance with the interference cancelation procedure.

16. The method of claim 13, wherein the second control signaling message comprises a field having a first value that indicates that the common codeword is to be received by the first UE over the first set of time and frequency resources.

17. The method of claim 13, wherein the first control signaling message comprises a field having a first value that indicates that the private codeword is to be received by the first UE over the second set of time and frequency resources.

18. The method of claim 13, wherein the first control signaling message schedules transmission of the first physical downlink shared channel message and the second control signaling message schedules transmission of the second physical downlink shared channel message, the method further comprising:
jointly processing the first physical downlink shared channel message and the second physical downlink shared channel message in accordance with one or more scheduling parameters of the one or more first scheduling parameters and the one or more second scheduling parameters being common.

19. The method of claim 13, wherein the first set of time and frequency resources and the second set of time and frequency resources completely overlap.

20. The method of claim 13, wherein the first control signaling message is a group common control signaling message and the second control signaling message is for the first UE.

21. The method of claim 12, wherein:
the downlink data for the UE comprises a first portion of one or more downlink messages for the UE and the additional downlink data for the UE comprises a second portion of the one or more downlink messages for the UE; and
the allocation of data comprises an allocation of bits between the first portion and the second portion that is based at least in part on a first channel quality associated with the common codeword and a second channel quality associated with the private codeword.

22. An apparatus for wireless communication at a first user equipment (UE), comprising:
one or more processors; and
memory coupled with the one or more processors and storing instructions executable by the one or more processors to cause the apparatus to:
receive one or more control signaling messages comprising:
one or more first scheduling parameters for a common codeword associated with downlink data for the first UE and with downlink data for a second UE, and
one or more second scheduling parameters for a private codeword associated with additional downlink data for the first UE, wherein an allocation of data between the downlink data and the additional downlink data is in accordance with one or more channel qualities; and
receive, in accordance with the one or more first scheduling parameters and the one or more second scheduling parameters, a physical downlink shared channel message comprising the common codeword mapped to one or more first layers of the physical downlink shared channel message and the private codeword mapped to one or more second layers of the physical downlink shared channel message.

23. The apparatus of claim 22, wherein:
the one or more first scheduling parameters comprise a first modulation and coding scheme associated with the common codeword;
the one or more second scheduling parameters comprise a second modulation and coding scheme associated with the private codeword; and
a first modulation and coding scheme index value associated with the first modulation and coding scheme is less than a second modulation and coding scheme index value associated with the second modulation and coding scheme.

24. The apparatus of claim 22, wherein a quantity of the one or more first layers of the physical downlink shared channel message is less than a quantity of the one or more second layers of the physical downlink shared channel message.

25. The apparatus of claim 22, wherein a first control signaling message of the one or more control signaling messages comprises one or more fields having one or more values that indicate the common codeword is mapped to the one or more first layers of the physical downlink shared channel message, the private codeword is mapped to the one or more second layers of the physical downlink shared channel message, or both.

26. The apparatus of claim 22, wherein:
the one or more control signaling messages comprise a first control signaling message that schedules transmission of the common codeword and a second control signaling message that schedules transmission of the private codeword; and
the first control signaling message is a group common control signaling message for a plurality of UEs, including the UE, and the second control signaling message is for the first UE.

27. An apparatus for wireless communication at a first user equipment (UE), comprising:
one or more processors; and
memory coupled with the one or more processors and storing instructions executable by the one or more processors to cause the apparatus to:
receive one or more control signaling messages comprising one or more first scheduling parameters for a common codeword associated with downlink data for the first UE and downlink data for a second UE, and one or more second scheduling parameters for a private codeword associated with additional downlink data for the first UE;
receive, in a first set of time and frequency resources and in accordance with the one or more first scheduling parameters, a first physical downlink shared channel message comprising the common codeword, wherein an allocation of data between the downlink data and the additional downlink data is in accordance with one or more channel qualities; and receive, in a second set of time and frequency resources that at least partially overlaps with the first set of time and frequency resources and in accordance with the one or more second scheduling parameters, a second physical downlink shared channel message comprising the private codeword.

28. The apparatus of claim 27, wherein the one or more control signaling messages comprise a first control signaling message scheduling transmission of the common codeword and a second control signaling message scheduling transmission of the private codeword.

29. The apparatus of claim 28, wherein the first control signaling message is in a first control resource set associated with a first control resource set pool index value and the second control signaling message is in a second control resource set associated with a second control resource set pool index value.

30. The apparatus of claim 28, wherein the first control signaling message schedules transmission of the first physical downlink shared channel message and the second control signaling message schedules transmission of the second physical downlink shared channel message, and the instructions are further executable by the one or more processors to cause the apparatus to:
jointly process the first physical downlink shared channel message and the second physical downlink shared channel message in accordance with one or more scheduling parameters of the one or more first scheduling parameters and the one or more second scheduling parameters being common.

* * * * *